(12) United States Patent
Bergh

(10) Patent No.: US 7,505,139 B2
(45) Date of Patent: Mar. 17, 2009

(54) SIGNAL PROCESSING FOR A SAGNAC INTERFEROMETER

(76) Inventor: Ralph A. Bergh, 4257 E. Nisbet Rd., Phoenix, AZ (US) 85032

( * ) Notice: Subject to any disclaimer, the term of this patent is extended or adjusted under 35 U.S.C. 154(b) by 100 days.

(21) Appl. No.: 11/682,549

(22) Filed: Mar. 6, 2007

(65) Prior Publication Data

US 2008/0218765 A1      Sep. 11, 2008

(51) Int. Cl.
 *G01C 19/72* (2006.01)
(52) U.S. Cl. ..................................................... 356/464
(58) Field of Classification Search ................. 356/459, 356/460, 464, 483
See application file for complete search history.

(56) References Cited

U.S. PATENT DOCUMENTS

| 4,299,490 | A  |   | 11/1981 | Cahill et al. |         |
|-----------|----|---|---------|---------------|---------|
| 4,869,592 | A  |   | 9/1989  | Bergh         |         |
| 5,141,316 | A  |   | 8/1992  | Lefevre et al.|         |
| 5,181,078 | A  | * | 1/1993  | Lefevre et al.| 356/464 |
| 5,485,274 | A  | * | 1/1996  | Kemmler       | 356/464 |
| 7,167,250 | B2 | * | 1/2007  | Chen et al.   | 356/464 |
| 2003/0202187 | A1 | * | 10/2003 | Lange et al. | 356/464 |

OTHER PUBLICATIONS

The Fiber-Optic Gyroscope, Herve Lefevre, Artech House (1992).
Otical Fiber Rotation Sensing, edited by William K. Burns, Academic Press (1993).

* cited by examiner

*Primary Examiner*—Michael A Lyons
(74) *Attorney, Agent, or Firm*—Robert A. Pajak

(57) ABSTRACT

Disclosed is a method and apparatus for modulating the phase difference between a pair of optical waves that exit a Sagnac interferometer, and, more particularly, one that is commonly employed as a fiber gyro, and includes a detector responsive to phase difference between the pair of waves that exit the interferometer, and a phase modulator that forms part of two control loops that are instrumental in deriving an accurate measurement of rotation rate. As disclosed herein, phase modulation applied equally to the pair of waves as they counter-propagate through the phase modulator induces modulation of the phase-difference between the two waves as they exit the interferometer. This phase difference modulation includes (i) a bias phase-difference modulation component having a selected frequency, amplitude, and waveform, (ii) a rotation-rate feedback phase-difference component that is equal in magnitude to, and opposite in sign of, the Sagnac phase difference, so that the sum thereof is controlled to be substantially zero, and (iii) a calibration feedback phase-difference modulation component that is characterized by a predetermined phase difference magnitude having substantially alternating positive and negative sign values.

32 Claims, 13 Drawing Sheets

SIGNAL PROCESSING FOR A SAGNAC INTERFEROMETER

FIELD OF THE INVENTION

The present invention relates, in general, to gyroscopes and, more particularly, to closed-loop fiber optic gyroscopes and, even more particularly, closed-loop fiber optic gyroscopes using a Sagnac interferometer.

BACKGROUND OF THE PRESENT INVENTION

A. Overview

A Sagnac interferometer comprises a splitting plate or other splitting device that divides an incident light wave into two lightwaves. The two waves thus created enter opposite ends of a single optical path formed into a loop. The two waves counter-propagate, pass through each other, and return to the splitting device. There they recombine and are sent to a detector where they produce interference that depends upon phase difference between the recombined waves.

Originally, mirrors defined the optical path of the Sagnac interferometers. It is now known that this optical path can be created using a single-mode optical fiber wound about an axis into a coil.

It is also known that rotating the coil about its axis changes the relative optical path lengths of the counter-propagating waves, engendering a phase difference between these waves when they recombine. The recombination of the two counter-propagated waves creates interference between them that is modified by their phase difference and thereby the rate of rotation of the fiber coil. This is known as the Sagnac effect. The measurement of this phase difference enables the rotation rate to be quantified.

Much work has been conducted in order to improve the sensitivity and accuracy of the rotation rate measurement performed with such a gyroscope. As regards this topic, it will for example be possible to consult the books "The Fiber-Optic Gyroscope" by Herve Lefevre, ARTECH HOUSE, 1992, and "Optical Fiber Rotation Sensing" edited by William K. Burns, ACADEMIC PRESS, 1993.

In particular, it has firstly been observed that the response furnished by the SAGNAC interferometer in its simplest form is $P(\Delta\phi)=P_0[1+\cos(\Delta\phi)]$ and hence that the sensitivity of this signal of detected optical power, $P(\Delta\phi)$, in the neighborhood of the phase difference $\Delta\phi=0$, is low. A graph of $P(\Delta\phi)$ versus $\Delta\phi$ is known as an interferogram. The sensitivity is also low near phase differences that are integer multiples of pi radians. A square wave phase difference modulation, with amplitude more or less pi/2 has been used to displace the operating point and produce a periodic signal the amplitude of which, $S(\Delta\phi)$, is a sinusoidal function of the rotation rate, $S(\Delta\phi)=S_0[\sin(\Delta\phi)]$, and which can hence be exploited with greater sensitivity and stability near phase differences of zero, $\Delta\phi=0$, or integer multiples of pi radians.

It was later shown that the accuracy of the measurement is improved by the use of a zero method, also called closed-loop operation. According to this method, an additional so-called negative-feedback phase difference $\Delta\phi_{mR}$ is applied, and serves to compensate for phase difference $\Delta\phi_R$ produced by the rotation rate. The sum of these two phase-differences, $\Delta\phi_{mR}$ and $\Delta\phi_R$, is kept null, thus enabling the interferometer to be operated with maximum sensitivity over a wide range of rotation rates. The signal necessary for producing the negative-feedback phase difference $\Delta\phi_{mR}$ is then exploited to derive a measurement of rotation rate. The measurement is then stable and linear.

The slaving necessary for this closed-loop operation can be performed through a frequency offset as was done using acousto-optic modulators in U.S. Pat. No. 4,299,490. Use of a pure frequency-shifting device, such as the acousto-optic modulators, is simple in principle, but difficult in practice.

The difficulty in implementing the frequency shifter approach led to reconsideration of closing the loop using a phase modulator. A constant frequency offset is equivalent to a constant rate-of-change in phase, or, in other words, a ramp in phase vs. time with a constant slope. A phase modulator can generate a phase ramp for a short period of time, but it then reaches the limit of its capability. An instantaneous $2\pi$ shift in the phase is transparent to an optical wave, and therefore a serrodyne waveform, consisting of a ramp and fall-back, created by a phase modulator appears like a continuous phase ramp and therefore also like a frequency shift.

A problem with phase modulators is that each phase modulator produces a slightly different phase modulation for a given electronic drive signal. Furthermore, the amount of phase modulation changes depending upon the temperature. This leads to an inadequate knowledge of the phase shifts that are imparted to the counter-propagating waves, and manifests itself in an inadequate knowledge of the phase shift used to compensate for the Sagnac phase difference and a less than accurate 2pi fall-back. To make an accurate determination of the phase shift, a second control loop is required.

The aforesaid second control loop has been implemented in different ways. All of these have in effect rendered the actual ratio of the phase modulation output to electronic input, i.e. the phase modulator transfer function, non-critical to the measurement of Sagnac phase difference. The second control loop calibrates the phase modulator transfer function against the response of the interferometer. If the second control loop works well, then the measurement becomes as good as the interferometer response, and therefore as good as fundamental parameters such as wavelength stability and fiber coil stability.

In the serrodyne approach, the signal following the fall back is used as the input to the second control loop. This signal indicates an error if the fall back differs from 2pi radians, and thus it calibrates the phase modulator transfer function with respect to the optical signal.

In order to simplify the electronic hardware, and reduce cost, the detector output is digitized, signal processed, and converted back into an analog waveform to drive the phase modulator. The electronic signal processing may comprise a combination of analog signal-conditioning electronics, conversion electronics, and digital electronics. With this arrangement it is easier to change the level of the electronic drive waveform in discrete steps rather than continuously. In a Sagnac loop interferometer, phase modulation steps can provide a similar phase difference between the recombined counter-propagated waves as a continuous ramp. The continuous ramp and fall-back then becomes a series of steps and a fall-back. See, for example, U.S. Pat. Nos. 5,039,220, 5,141, 316, 5,181,078.

An alternative approach is called dualramp feedback and it uses two phase ramps to shift the phase difference back and forth from pi radians to minus pi radians as described in U.S. Pat. No. 4,869,592. This approach has been implemented using largely analog electronics and two control loops, one for the plus pi phase difference and one for the minus pi phase difference. The staircase form of this phase modulation method amounts to taking two or more steps in each direction, i.e. up and down, some times referred to as "dual staircase modulation". The dual staircase modulation is distinguished from the staircase-and-fall-back method because the former takes two or more steps in each direction while the latter uses only a single step in the opposite direction of the staircase to keep the phase modulator and electronics within their ranges of operation. Illustrated in U.S. Pat. No. 6,744,519 is a version of the dual staircase modulation waveform.

The dual-staircase feedback is better than the continuous ramp up and ramp down, not only because of better compatibility with digital electronics, but also because the dual-staircase approach has a much shorter switching time between plus pi phase difference and minus pi phase difference relative to the dual-ramp approach. The switching time changes a couple of orders of magnitude from the order of microseconds, approximately the propagation time through the fiber loop, to a few nanoseconds, the rise time of the phase step.

B. Basic Fiber Gyroscope Design

The fiber-optic gyroscope, see FIG. 1, includes a quasi-monochromatic light source 15, that is most often a super-luminescent diode or a laser diode pumped erbium-doped optical fiber, and a single-mode fiber optic Sagnac loop interferometer, designated overall by the reference 10. The Sagnac loop interferometer 10 comprises a first beam splitter 19 and an optical path 20 constituted by a single-mode optical fiber wound into a coil. The incident light wave is divided into two waves by the beam splitter. The two waves thus created are fed into opposite ends of the optical fiber and propagate in opposite directions, or counter-propagate, through the fiber. The counter-propagating waves pass through each other and return to the beam splitter where they are each split again thereby creating four waves. Two of these four waves, a portion from each of the counter-propagated waves, combine with each other and return in the direction of the source of the incident wave while the other two combine with each other but exit the interferometer through the unused port of the first beam splitter 19 and are discarded.

This gyroscope likewise comprises a detector 11 furnishing an electrical signal that is proportional to the optical power incident upon it. The optical power is a function of phase difference between the combined counter-propagated waves. In other words, the combined waves interfere with each other and the amount of the optical power at the detector is a function of the state of this interference. A graph of the detected optical power vs. total phase difference between the interfering waves is known as the interferogram, see FIG. 2, and also FIGS. 10c, 11b and 12b. The optical signal is furnished to the detector 11 via a second beam splitter 16 that can be constituted, for example, by a semi-transparent mirror.

In the optical path of the interferometer there is interposed a modulator 14 that, controlled on the basis of an electrical signal, imparts a phase shift $\phi_m(t)$ to both of the counter-propagating waves. The difference in the propagation time from the phase modulator to the detector in one direction around the loop versus the other is $\tau$, and therefore a modulation of $\phi_m(t)$ applied to both waves at the phase modulator 14 creates a phase difference $\Delta\phi_m(t)=\phi_m(t)-\phi_m(t-\tau)$ between the two waves at the detector 11. Phase modulation, $\phi_m(t)$, is distinguished from phase difference modulation, $\Delta\phi_m(t)$, in the discussion that follows. Phase modulation, $\phi_m(t)$, is added to the phase of each of the counter-propagating waves at the phase modulator 14. Phase difference modulation, $\Delta\phi_m(t)$, is the modulation of the difference between the phases of the two waves as they interfere with each other at the detector 11. The detected optical power is largely dependent upon the total phase difference, $\Delta\phi_T(t)$, between the interfering waves. The total phase difference is ideally the sum of the modulated phase difference plus the rotation-rate induced phase difference.

The operation of the interferometer is improved by interposing a polarizer 17 and a spatial filter 18 between the second beam splitter 16 and the first beam splitter 19. In a known manner, this spatial filter is constituted by a single-mode optical fiber. Light returning from the interferometer 10 must have a component of its polarization aligned with pass axis of the polarizer 17. Employing polarization-maintaining fiber with its axes of birefringence properly aligned will ensure that some light is passed by the polarizer 17 and delivered to the detector 11. If the pass axis of the polarizer 17 is vertical, and the slow axis of each of the fiber ends is vertical, and the first beam splitter 19 is relatively insensitive to the polarization of the light, or its birefringence axis is similarly aligned, then a large amount of the light returning to the polarizer 17 will pass through to the second beam splitter 16 and on to the detector 11.

The output of the detector 11 is prepared and digitized with an analog-to-digital converter 12. The proper signal preparation necessary to avoid excess errors in the digital conversion is described in the next subsection. Closed-loop signal processing and digital-to-analog conversion electronics, herein referred to as signal processor 13, provides negative feedback to control the phase modulator 14 as a function of the signal received from the detector 11. It also creates the bias modulation that is added to the feedback modulation. Finally it derives the rotation rate measurement value that is output for external use.

C. Analog-To-Digital Conversion

A block diagram of analog-to-digital conversion electronics 12 of FIG. 1 is shown in FIG. 3. The output of the detector 11 passes through an amplifier 21 and a low-pass filter 22 before reaching the analog-to digital converter (ADC) 23. Analog-to-digital conversion changes an electronic signal and electronic noise that accompanies the signal, but this change can be made to have almost negligible impact in the signal-to-noise ratio if three criteria are met. The first criterion is that the noise accompanying the analog signal must have a standard deviation that is larger than about one least significant bit (LSB) of the ADC 23. The amplifier 21 is used to increase both signal and noise that is output from the detector 11 to satisfy the first criterion. The second criterion is that the dynamic range of the signal and noise are smaller that the dynamic range of the ADC 23. Thus the amplifier is not allowed to over-amplify the signal and noise, and the ADC must have enough bits to measure the signal plus noise. The third criterion is that the low-pass filter 22 must attenuate the analog frequency components that are approximately equal to or greater than the sampling frequency of the ADC 23. These components are undesirable because high frequency analog noise can alias to low frequency digital noise by the digitization process.

Satisfying the above stated criteria renders sampling noise negligible relative to noise present in the analog signal. Moreover, additional digital filtering leads in this case to the same improvement in the signal-to-noise ratio as filtering would accomplish in analog mode. As a practical example, the sampling period is $\frac{1}{16}$ times the propagation time $\tau$, namely, for example $\tau=5$ microseconds for 1000 meters of fiber, and the sampling period is 0.31 microseconds. The Shannon criterion therefore imposes a large pass band on the signal to be sampled: it has to be equal to 1/(2 times the sampling period), namely 1.6 MHz in this example. In such a pass band the noise is relatively large: typically a standard deviation of $10^{-3}$ of the detected optical power, which corresponds to a phase shift of about $10^{-3}$ radians in the interferometer. Hence it is sufficient, in order not to lose sensitivity and in order to be able later to improve the signal to noise ratio by filtering, that the LSB correspond to this phase shift.

For its part, the high limit must be at least greater than the peak-to-peak value of the noise, namely about 8 times its standard deviation and hence 3 bits would suffice for sampling the noise alone. However, account must also be taken of the inherent variations in the signal: in closed-loop mode the latter is slaved to zero and would not therefore a priori lay claim to any variations but in practice the slaving deviates from zero during changes in the rotation rate, i.e. angular acceleration, and the dynamic range of the converter must be able to cope with these deviations. These variations therefore define the number of necessary bits. In practice 8 to 12 bits are sufficient at the converter level, whilst after digital filtering the dynamic range of the rotation rate measurement can be greater than 20 bits.

D. Closed-Loop Signal Processing and Digital-To-Analog Conversion Electronics

Closed loop signal processing block diagrams as well as digital-to-analog conversion electronics take different forms depending upon the loop closure approach. Two approaches are reviewed: first the staircase-and-fall-back approach and second the dual staircase approach. Each of these two approaches uses two control loops, but they have quite different configurations.

The staircase-and-fall-back approach described here has a first control loop to null the Sagnac phase difference and a second control loop to control the gain of the digital-to-analog conversion and phase modulation portions of the first control loop. I will refer to the first control loop of this approach as the rotation-rate control loop because it is responsive to the rotation rate. I will refer to the second control loop as the calibration control loop because it calibrates the digital values in the signal processing against the phase modulation of the optical wave.

The prior-art dual staircase approach also has two control loops, a first control loop to control the height of the up-steps to shift the total phase difference to plus pi radians and a second to control the down steps to shift the total phase difference to minus pi radians. When the gyroscope is rotating, the up-step height is not the same as the down-step height. Therefore there is a difference between the number of up steps and the number of down steps and this difference is used as a measure of rotation. The rotation rate measurement in both the dual-staircase approach and the staircase-and-fall-back approach is largely independent of the phase modulator transfer function.

The signals involved in the above-mentioned control loops share the same path through most of the gyroscope. Their paths differ only within the closed loop signal processing and the digital-to-analog conversion electronics. To trace the common paths we can begin at the phase modulator 14, progress through the optics, through the detector 11, and through the analog-to-digital conversion electronics 12. The latter comprises the amplifier 21, the low-pass filter 22, and the ADC 23. The completion of the individual paths through the signal processing and through the digital-to-analog conversion electronics is discussed below.

1. Staircase-And-Fall-Back Signal Processing Block Diagram and Corresponding Waveform Block 13 of FIG. 1 is shown in more detailed block diagram form for the staircase-and-fall-back approach in FIG. 4. To become familiar with this block diagram we trace the paths of the feedback signals from block to block to complete the control loops discussed above. We will then show where the bias modulation is introduced and afterwards discuss the operation of the loops.

The first control loop, i.e. the rotation-rate loop, is completed by sending the signal from ADC 23 through a rotation-rate processor 44, a feedback accumulator 46, through an adder 52, a multiplying DAC 55 and an amplifier 32 before returning to the phase modulator 14. Completion of the second control loop, i.e. the calibration control loop, from ADC 23 to phase modulator 14 is by way of a calibration processor 45, DAC 56, multiplying DAC 55, and amplifier 32.

A digital version of the bias waveform is generated in a bias waveform generator 53, added to the feedback waveform in an adder 52. Its amplitude is adjusted in the multiplying DAC 55 and is amplified in amplifier 32 and sent to phase modulator 14. The bias modulation causes the rotation-rate signal entering the rotation-rate processor 44 to be modulated at the bias modulation frequency. Demodulation at the bias modulation frequency returns the rotation-rate signal to the same frequency as the actual rotation rate. For example, a constant rotation rate of the gyroscope would yield a DC, i.e. constant, rotation-rate signal after demodulation.

The input to the rotation rate processor 44 is the digitized detector signal and the output of the rotation-rate processor 44 is a digital value corresponding to the rotation rate. The rotation rate digital value in this approach is the desired output and is delivered directly to the measurement output 41.

The input of the calibration signal processor 45 is the same as the input of the rotation-rate signal processor 44. The demodulation in the calibration signal processor 45 is, however, quite different. For calibration purposes the important part of the input signal occurs in relation to the fall back of the feedback signal, and thus calibration demodulation frequency is the same as the staircase-and-fall-back frequency. The demodulation reference signal comes directly from the feedback waveform generator 30. The output of the calibration signal processor 45 is a pi digital value corresponding to a predetermined optical phase difference. The DAC 56 converts the pi digital value to a calibration analog signal, and that calibration analog signal becomes the reference signal to the multiplying DAC 55. As the multiplying DAC 55 reference signal, the calibration analog signal adjusts the gain of the multiplying DAC 55 for the feedback waveform coming from the feedback accumulator 46 through adder 52 and going to amplifier 32. The gain is adjusted to keep the total gain from the output of the feedback waveform accumulator 46 to the actual phase modulation imparted to the optical waves constant.

An example of the staircase-and-fall-back phase modulation for the above electronics is shown in FIG. 5. FIG. 5a shows a staircase with a step width of $\tau$ seconds, approximately the propagation time of light around the fiber loop. Each step height on FIG. 5a is equal to $\Delta\phi_{mR}=\pi/6$, to compensate for a Sagnac phase shift of $\Delta\phi_R=-\pi/6$ due to rotation rate. The overflow of the accumulator creates the fall back or a step down of $2\pi-\Delta\phi_{mR}=11\pi/6$. The bias modulation $\phi_{mb}(t)$ shown in FIG. 5b is added to the staircase-and-fall-back feedback modulation $\phi_{mfs}(t)$ to complete the phase modulation $\phi_{ms}(t)$ shown in FIG. 5c. The phase modulation is repeated in FIG. 5d along with the phase modulation $\phi_{ms}(t-\tau)$ of the other counter-propagating wave (dotted line) that took the long way from phase modulator to detector and is delayed by $\tau$. The difference of the two waveforms in FIG. 5d is the phase difference modulation $\Delta\phi_{ms}(t)=\phi_{ms}(t)-\phi_{ms}(t-\tau)$ and it is shown in FIG. 5e. The phase difference is a square wave with the exception of a 2pi-shifted portion due to the fall-backs.

The short-term average not including the 2pi-shifted portions is displaced from zero to compensate for the Sagnac phase difference, but the long-term average including the 2pi-shifted portions is precisely zero.

2. Dual-Staircase Waveform and Corresponding Closed-Loop Signal Processing Block Diagram The prior-art version of the dual-staircase modulation for the same Sagnac phase shift of $\Delta\phi_R=-\pi/6$ is shown in FIG. 6. The up steps have a different height from the down steps, see FIG. 6*a*, because the phase difference must be shifted from $\Delta\phi_R=-\pi/6$ to plus pi during the up steps and to minus pi during the down steps. Specifically, the up steps have a step height of $7\pi/6$ to shift the phase difference from $-\pi/6$ to $+\pi$ and the down steps have a step height of $5\pi/6$ to shift the phase difference from $-\pi/6$ to $-\pi$. Note that it is necessary to have more down steps than up steps to keep the phase modulation within the range of the phase modulator. The bias modulation $\phi_{mb}(t)$, shown in FIG. 6*b*, is added to the feedback modulation $\phi_{mfdspa}(t)$ to create the total phase modulation $\phi_{mdspa}(t)$ of FIG. 6*c*. The resulting phase difference modulation $\Delta\phi_{mdspa}(t)$ is shown in FIG. 6*d*. Note that the phase difference modulation $\Delta\phi_{mdspa}(t)$ is offset by $\pi/6$ to compensate for the Sagnac phase difference $\Delta\phi_R(t)$ of $-\pi/6$.

Block 13 of FIG. 1 is shown in more detailed block diagram form for the dual-staircase approach in FIG. 7. To become familiar with this block diagram we trace the paths of the feedback signals from block to block to complete the control loops from the ADC 23 to the phase modulator 14. In this prior art version of the dual-staircase approach one of the two control loops controls the height of the up steps of the above-mentioned modulation waveform, and the other controls the height of the down steps. We will then show where the bias modulation is introduced and afterwards discuss the remaining blocks of the diagram.

As part of both control loops a demodulator 48 receives the digitized signal from the ADC 23. The output of the demodulator 48 then feeds the up-step accumulator 49 after each up-step and the down-step accumulator 50 after each down step. A multiplexor 51 brings the loops back together again by switching the outputs of either the up-step accumulator 49 or the down-step accumulator 50 to a feedback accumulator 30 depending upon whether up-steps or down-steps are required to keep the output of the feedback accumulator 30 within a specified range. The feedback accumulator 30 outputs a series of digital values corresponding to the feedback modulation waveform, see, for example, FIG. 6*a*. This feedback modulation waveform is added to the bias modulation waveform, see FIG. 6*b*, output from the bias waveform generator 53, in an adder 52 The DAC 31 receives the signal from the adder 52, converts it to an analog signal and delivers it to an amplifier 32 that in turn drives the phase modulator 14.

Limits of the feedback accumulator 30 are preset in a limit detector 31. The limit detector receives the output of the feedback accumulator 30 and compares it against these limits and outputs a signal to the multiplexor 51 that selects which of either the down-step-accumulator 50 output or the up-step-accumulator 49 output will be delivered to the input of the feedback accumulator 30. The output of the limit detector 31 also drives the input of an up/down counter 54. The up/down counter 54 adds one to its output for every up step and subtracts one from its output for every down step. The output of the up/down counter 54 is a measure of the rotation rate and it is delivered to the measurement output 41 for external use.

A digital version of the bias waveform is generated in a bias waveform generator 53, added to the feedback waveform in an adder 52. The sum of the bias modulation and the feedback modulation is converted to an analog signal by the DAC 31 and is amplified in amplifier 32 and sent to phase modulator 14. The bias modulation causes the rotation-rate signal entering the demodulator 48 to be modulated at the bias modulation frequency. Demodulation at the bias modulation frequency returns the rotation rate signal to the same frequency as the actual rotation rate.

SUMMARY OF THE INVENTION

An object of the present invention is the provision of an improved closed loop fiber optic gyroscope having improved performance characteristics.

The fiber optic gyroscope of the present invention employs a well known Sagnac interferometer including an optical fiber, a phase modulator, and a detector. A pair of optical waves exits the Sagnac interferometer after having counter-propagated through a common optical path, including the optical fiber and the phase modulator, and impinges upon the detector that produces a detector output signal responsive to the combined optical power of the pair of optical waves. The output of the detector is indicative of the total phase difference between the pair of optical waves that specifically includes, among others, (i) any Sagnac phase difference induced into the optical path (e.g., rotation of the common optical path), and (ii) a phase-difference modulation induced by the phase modulator in response to a command signal. A properly positioned phase modulator in the optical path is such that the phase modulator imparts a substantially equally phase modulation onto the waves of the counter-propagating waves passing therethrough, and results in phase difference between the pair of optical waves discernable at the detector.

In accordance with the present invention, the phase modulator is driven by a command signal that causes the phase-difference modulation between the pair of optical waves to have (i) a bias phase-difference modulation component having a selected frequency, amplitude, and waveform, (ii) a rotation-rate feedback phase-difference component that is equal in magnitude to, and opposite in sign of, the Sagnac phase difference, so that the sum of the two is controlled to be substantially zero, and (iii) a calibration feedback phase-difference modulation component.

A first feedback control loop is employed to derive a rotation rate feedback phase difference component signal as a function of: (i) the detector output signal, and (ii) demodulated by a bias modulation signal that results in the bias phase-difference modulation component, where the rotation-rate feedback phase-difference component signal is a signal processing counterpart of the rotation-rate feedback phase-difference component, and is indicative of the rate of rotation of the Sagnac interferometer.

A second feedback control loop is employed to derive a calibration signal corresponding to a predetermined phase difference as a function of, (i) the detector output signal, (ii) demodulated by the product of the bias modulation signal, and (iii) a calibration feedback phase-difference modulation component signal, where the calibration-feedback-phase-difference-modulation-component signal is a signal processing counterpart of the calibration feedback phase-difference modulation component. The calibration feedback phase-difference modulation component signal is derived by modulating the calibration signal, in part to restrict the command signal to a given range of values. Finally, the phase modulator command signal is generated as a function of: (i) the rotation rate feedback phase difference component signal, (ii) the calibration feedback phase-difference modulation component signal, and (iii) the bias modulation signal. Alternatively the bias modulation can be added after the accumulation of the other two signals.

In one embodiment of the invention a dual staircase modulation is employed as the command signal that includes an even number of up steps followed by an even number of down steps.

In another aspect of the present invention, the control loops are digitized producing a digital rotation-rate digital value, and a digital calibration signal that may be processed by a simple dividing process to produce rotation rate output for external use.

In another aspect of the present invention, two filters are used in the first feedback loop to speed up the signal processing of the rotation-rate feedback phase-difference component signal.

BRIEF DESCRIPTION OF THE DRAWINGS

FIG. 8a is less detailed and emphasizes with dark lines the paths of two major control loops. FIG. 8b is a more detailed and complete block diagram of the same dual-staircase signal processing.

DETAILED DESCRIPTION OF THE INVENTION

A. Introduction.

Figure 1:
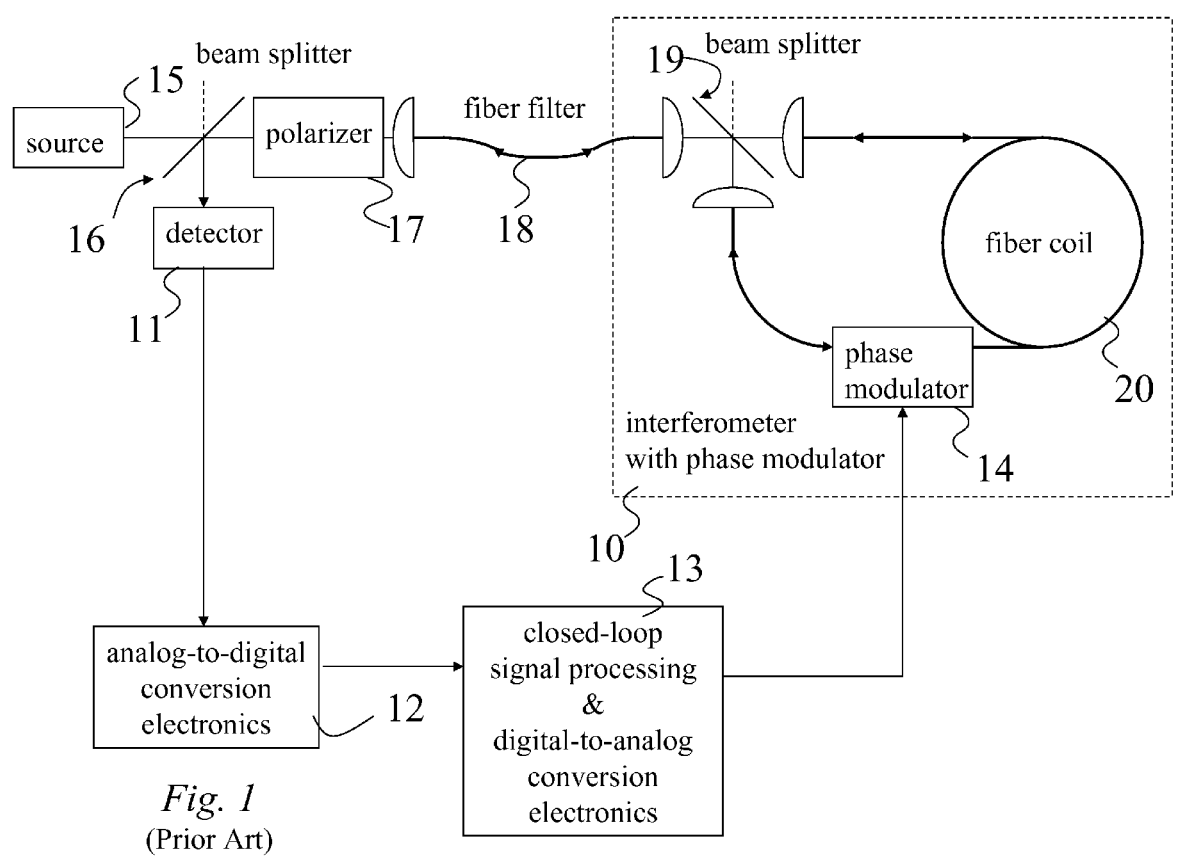
FIG. 1 is a general representation of the closed-loop fiber optic gyroscope of the related art and of the present invention.
Figure 4:
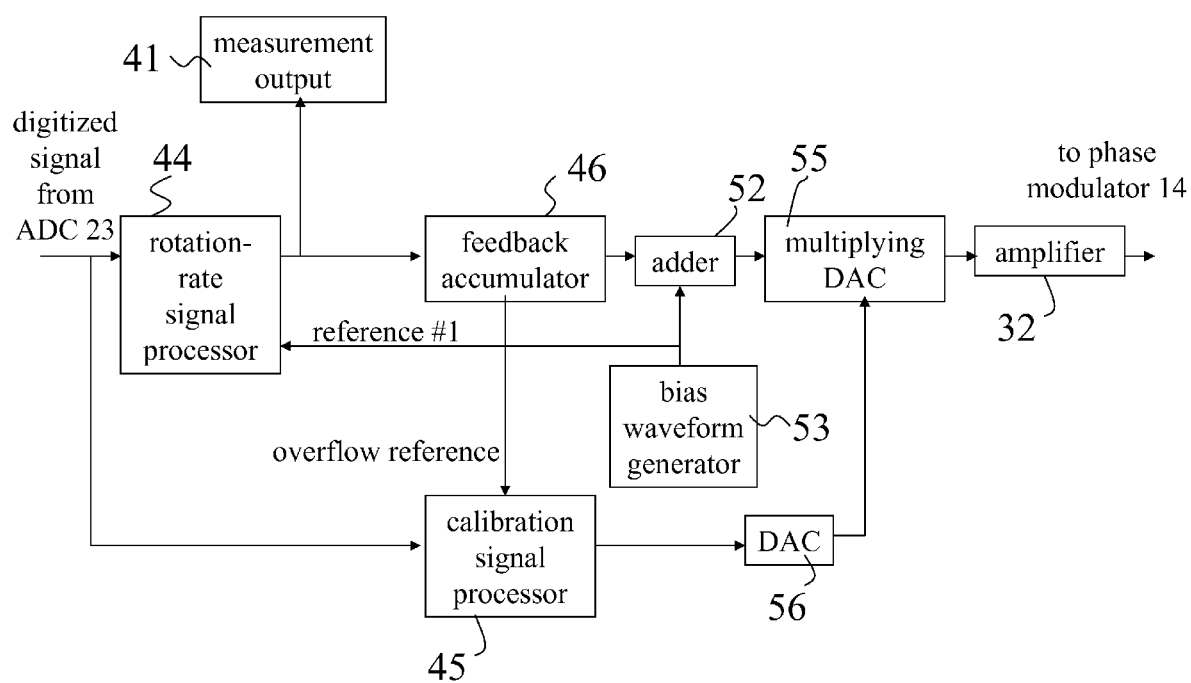
FIG. 4 is a block diagram representing the electronics of the staircase-and-fall-back signal processing and digital-to-analog conversion electronics of the related art.
Figure 5:
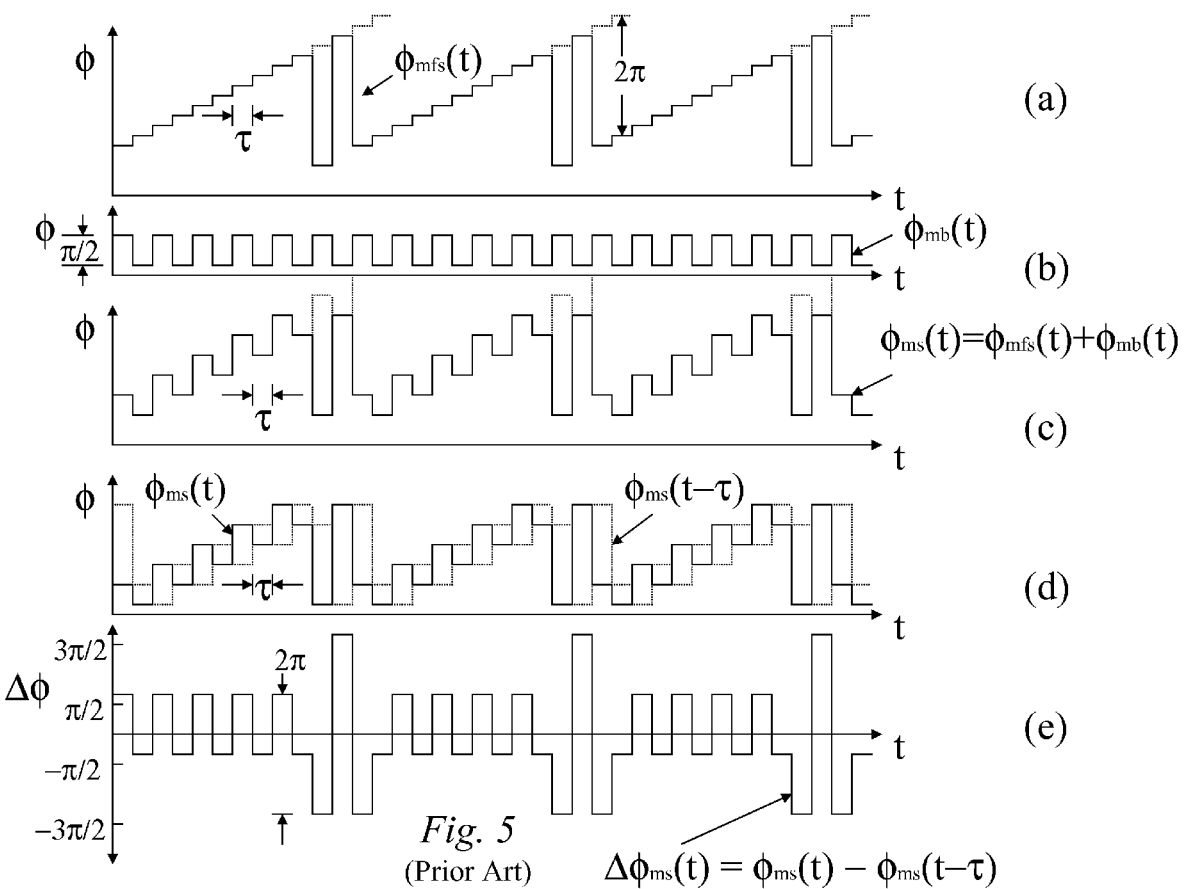
FIG. 5 is a set of waveforms for the staircase-and-fall-back feedback approach of the related art.
Figure 6:
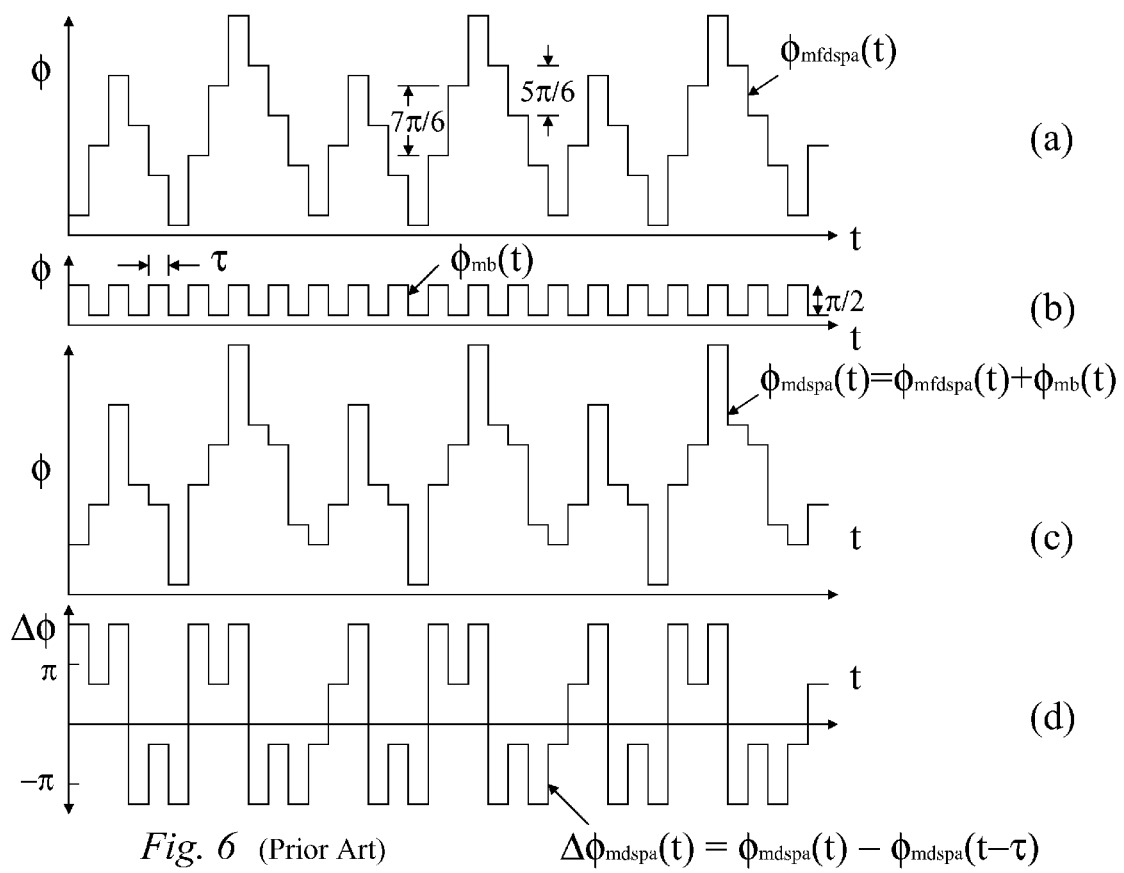
FIG. 6 is a set of waveforms for the dual-staircase feedback approach of the related art.
Figure 7:
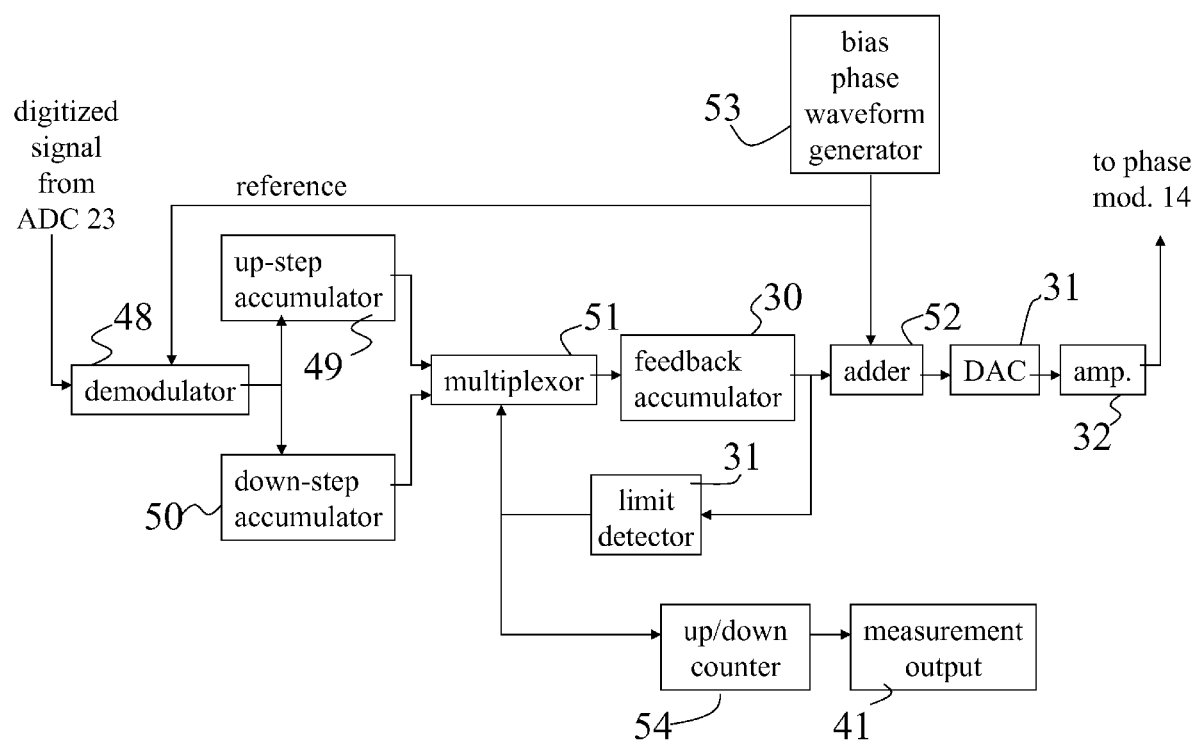
FIG. 7 is a block diagram representing signal processing of the dual-staircase feedback approach and digital-to-analog conversion electronics of the related art.

A general block diagram of the fiber optic gyroscope employed in accordance with the present invention, and also of the prior art, is depicted in FIG. 1 as aforedescribed in the prior art subsection "B. Basic Fiber Gyroscope Design". The closed loop signal processing & digital-to-analog (DAC) conversion electronics 13 may take on a variety of forms as will be described with reference to the block diagrams of FIGS. 4 and 7 illustrating the prior art, and the block diagram of the present invention illustrated in FIG. 8. The differences between the present invention and the prior art are explained in part by comparing these block diagrams and by comparing the modulation waveforms of the invention shown in pictographs of FIGS. 9-12 to the prior-art waveforms shown in the pictographs of FIGS. 5 and 6 descriptive of the behavior of the present invention.

In the following exposition, phase modulation and phase difference modulation will first be discussed, followed by a discussion of the major control loops of the present invention with comparison to those of the prior art. This will be followed by a description of the block diagram of the signal processing of the present invention by way of the block diagram illustrated in FIGS. 8a and 8b, and completing the description of the invention with a discussion of modulation waveforms.

B. Phase Modulation and Phase Difference Modulation

This subsection begins by reiterating how phase modulation applied to two counter-propagating waves within a Sagnac interferometer becomes phase difference modulation between the two waves as they exit the interferometer and interfere with each other at the detector. The seemingly complex phase difference modulation as a sum of three relatively simple phase difference modulation components is described, and that digital signal modulations present within the signal processing correspond directly to both phase modulation and to phase difference modulations. Understanding this correspondence will also make it easier to understand the signal processing as set forth herein.

Herein, the term 'phase modulation' and the symbol '$\phi_m(t)$' are reserved for the modulation applied to both of the counter-propagating waves at the phase modulator and the terms 'phase difference,' and 'phase difference modulation,' and the symbol '$\Delta\phi(t)$' are used in reference to the difference between the phases of the counter-propagating waves as they interfere with each other at the detector. The two counter propagating waves are derived from a single light wave. Thus any phase difference at the detector is due to the relative length of their optical paths as they propagate in opposite directions around the fiber loop. Their differences are ideally due to the rotation rate of the interferometer and phase difference modulation. The phase modulation creates phase difference modulation because the phase modulator is not at the center of the fiber loop. In fact it is typically positioned at one end of the fiber loop. A first light wave propagating in one direction passes through the phase modulator just before it leaves the interferometer and it reaches the detector almost immediately thereafter. A second light wave propagating in the opposite direction passes through the phase modulator and then through the fiber loop. Phase modulation applied equally to both waves is not equal for the two waves interfering at the detector. For the two waves arriving at the detector at the same time, difference in their phases due to modulation, $\Delta\phi_m(t)$, results from one wave receiving its modulation a negligibly short time earlier and another counter propagating wave receiving its modulation $\tau$ seconds earlier still, and related according to the formula:

$$\Delta\phi_m(t) = \phi_m(t) - \phi_m(t-\tau).$$

The value '$\tau$' as used herein is the optical wave propagation time difference between the short and long paths from phase modulator 14 to detector 11.

The Sagnac interferometer together with the off-center phase modulator 14 converts phase modulation at the phase modulator 14 into phase difference modulation at the detector 11 according to the above formula. Within the closed loop signal processing, see FIG. 8*a* and the previous discussion, the feedback accumulator 30 does the reverse. A digital signal modulation that corresponds to phase difference modulation at the input of the feedback accumulator 30 is converted into a digital signal modulation that corresponds to phase modulation at its output. In fact, the output digital signal modulation is converted to an analog electrical signal that drives the phase modulator. The phase modulation might then be considered an intermediate stage between digital signal modulation corresponding to phase difference modulation and actual phase difference modulation. This correspondence between the digital signal modulation at the input of the feedback accumulator 30 and the phase difference modulation will make it easier to understand the signal processing block diagram in FIG. 8.

The phase modulation is designed to accomplish four major tasks simultaneously, and can be understood as the sum of three separate component modulations. First of these three is a bias modulation that enables electronics to create a demodulated error signal that is linearly related to any small additional phase differences. Second is a feedback modulation that compensates for phase difference due to rotation. This compensation is imperfect in the short term, but by keeping the phase difference small to maintain the linear relationship, any error is not lost and the error can be compensated for in the long term. A third component of modulation performs two functions. It keeps the phase modulation from exceeding dynamic of the phase modulator 14, and it calibrates digital values within the signal processing in terms of phase modulation of the optical waves within the interferometer. Improving this third component of modulation is one of the purposes of this invention. These three modulation components will be discussed in more detail in the next three subsections. The latter two will be discussed beginning with the subsection on control loops.

The bias modulation is not directly controlled in a control loop. That is, a change in the bias modulation does not cause a feedback loop to correct that change. It is a facilitator for the control loops, but it is not directly part of feedback control. Bias modulation has been a part of the earliest fiber gyroscopes; long before sophisticated closed-loop designs were conceived. Sine wave bias modulations were first used, but square wave bias modulations are preferred when using a high-speed phase modulator 14. Bias modulation can be separated spectrally into frequency components, the lowest of which is known as fundamental frequency. Other frequency components are integer multiples of the fundamental frequency; preferably odd integer multiples of the fundamental frequency. If the fundamental frequency of the bias modulation is matched to the phase modulator position in the Sagnac interferometer such that its period is $2\tau$ then regardless of the shape of the bias phase modulation waveform, it transforms to a bias phase difference modulation that oscillates symmetrically about zero. Therefore when the bias phase difference modulation is added to another phase difference, then the total phase difference oscillates back and forth symmetrically about the preexisting phase difference.

Figure 2:
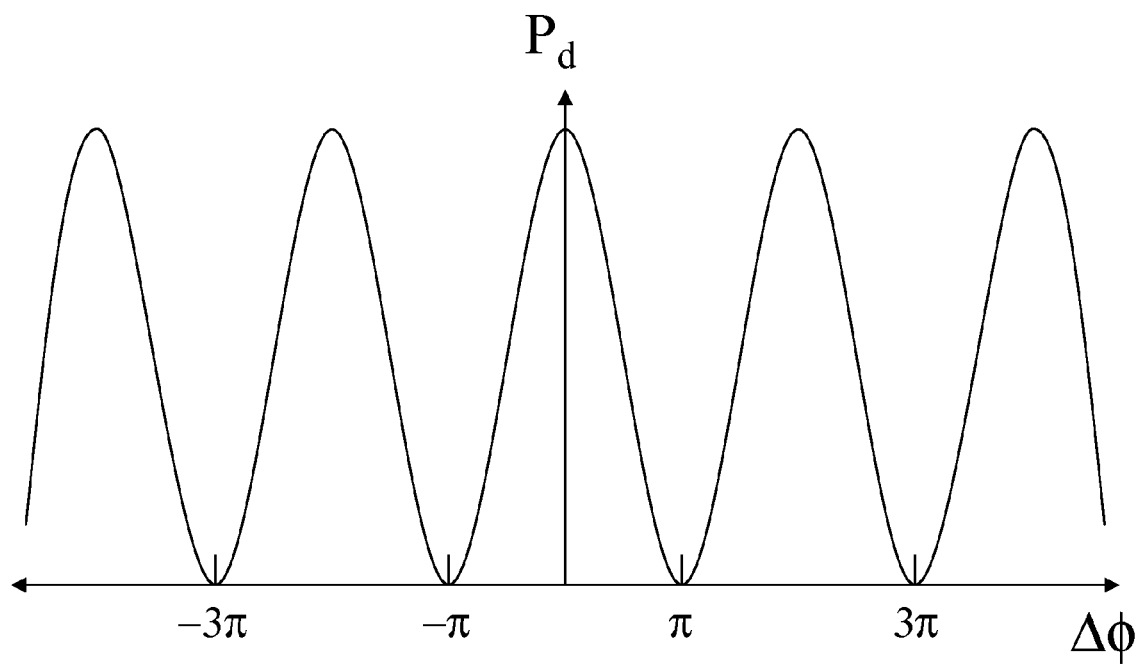
FIG. 2 is an interferogram, i.e. a plot of detected optical power versus phase difference, of the related art and of the present invention.

The bias phase modulation of the preferred embodiment of the present invention is a square wave with period $2\tau$ and peak-to-peak amplitude pi/2. This becomes a square wave bias phase difference modulation with the same $2\tau$ period, but with peak-to-peak amplitude of pi. A small phase difference, $\Delta\phi_\epsilon$, is shifted with bias phase difference modulation alternately to $$\frac{\pi}{2} + \Delta\phi_\epsilon$$

for duration $\tau$ and to $$\frac{\pi}{2} - \Delta\phi_\epsilon$$

for duration $\tau$. The latter values are sensitive to small changes in the original small phase difference $\Delta\phi_\epsilon$. Similar small phase differences near pi are shifted back and forth to values near 3pi/2 and pi/2. Also phase differences near minus pi are shifted back and forth to values near minus pi/2 and minus 3pi/2. The average phase difference after each cycle of the bias modulation is still the same as it would be without the bias modulation, but the phase difference spends almost all the time on one steep slope or another of the interferogram, see FIG. 2. This shifting of the phase difference is possible from any phase difference, but the control loops described in this document use integer multiples of pi.

The detected optical power is the same for all odd integer multiples of pi/2 radians of phase difference. Therefore while the phase difference is shifting by large amounts, from say minus 3pi/2 to minus pi/2 to pi/2 to 3pi/2, the detected optical power remains constant except for spikes in optical power that occur during the transitions from one phase difference value to another.

If a small phase difference is added, then the square wave bias phase difference modulation is centered on the small additional phase difference, and this causes a square wave modulation of the optical power at the detector. The amplitude of the detected optical power modulation is approximately proportional to the small additional phase difference. More generally, detected optical power modulation amplitude is a sinusoidal function of any additional phase difference, and the sinusoidal function is approximately linear to small phase deviations about zero phase difference and small deviations about any integer multiple of pi radians. Detector output is an electrical signal that is proportional to the detected optical power. The electrical signal is demodulated to derive an error signal upon which a control loop will act.

The amplitude of the bias modulation is selected above to be pi/2, but this value is not necessary. Any value between 0 and pi will work, and there are good reasons for selecting values other than pi/2 to optimize one characteristic or another. For example, in the dual-staircase approach, reducing the amplitude of the bias modulation can reduce the noise in the rotation-rate measurement. For this reason bias modulation amplitudes of pi/4 and pi/8 might be considered to better meet the noise requirements of some applications.

C. Control Loops

There are two major control loops in each of three designs mentioned in this document. The three designs are: the staircase-and-fall-back design of the prior art; the prior art dual-staircase design; and a dual-staircase design of the present invention. The staircase-and-fall-back design described in the prior art subsection D with the help of FIGS. 4 and 5 uses a rotation-rate loop and a calibration loop. This is quite different from the prior art dual staircase approach described also in the prior art subsection D with the help of FIGS. 6 and 7. The prior art dual staircase approach uses one control loop for the up steps and one control loop for the down steps. As part of the current invention we adapt the use of a rotation-rate control loop and a calibration loop to the dual-staircase approach. This is described with the help of FIGS. 8-12. A comparison can be made between the way the present invention and prior art apply the rotation rate and calibration control loops by referring to FIG. 8 and FIG. 4 respectively.

The rotation rate control loops of FIGS. 4 and 8 produce a phase difference, $\Delta\phi_{mR}(t)$, that is intended to be equal and opposite to the phase difference due to rotation, i.e. the Sagnac phase shift, $\Delta\phi_R(t)$. The rotation rate loop thus attempts to null the sum of these two phase-differences. If the rotation rate changes in time, then the Sagnac phase shift changes, and an error signal becomes nonzero. The phase difference $\Delta\phi_{mR}(t)$, is adjusted to zero the error signal, and thereby become once again equal to the Sagnac phase difference. The phase difference $\Delta\phi_{mR}(t)$ is thereby proportional to the rotation rate, and the digital value used to create it is also proportional to the rotation rate.

The calibration control loop measures or imposes a relationship between digital values and a predetermined phase difference. It performs a real time calibration of the signal processing with respect to the interferogram. It is implemented differently between the staircase-and-fall-back approach, as shown in FIG. 4, and the preferred embodiment of the dual staircase approach, FIG. 8. In the staircase-and-fall-back approach the overflow of the feedback accumulator 30 creates a step that is scaled to be equivalent to 2pi radians of optical phase shift by the calibration control loop. Thus the full range of the accumulator is made to correspond to a phase shift of 2pi radians. To accomplish this scaling the calibration control loop adjusts the transfer function of the multiplying DAC 55. This imposes a given transfer function, or gain, between the digital values in the signal processing and the actual phase modulation of the optical waves. In the dual staircase approach of the invention a separate modulation is created within the calibration control loop to shift a phase difference back and forth from plus pi to minus pi. Passing this calibration modulation through the feedback accumulator 30 makes the up steps and the down steps of the dual staircase phase modulation. In this way the calibration loop in the dual staircase approach determines a digital value that corresponds to a fixed phase shift. The calibration loop of the preferred embodiment of the dual staircase approach measures the relationship between the digital values of the signal processing and a phase modulation of pi radians, but it does not impose a relationship as in the calibration loop of the staircase-and-fall-back approach.

The dual staircase signal processing of the present invention is significantly better than the prior-art dual staircase signal processing. Whereas the prior art approach operated its two control loops sequentially i.e. operating one loop while the other loop is off and vice versa, the dual staircase signal processing of the present invention operates both of its control loops simultaneously. This makes the control loops more stable and the measurement more accurate.

The dual staircase signal processing of the present invention is significantly better than the prior-art staircase-and-fall-back approach. Measuring the gain between the digital values and the phase modulation makes the electronics significantly simpler than imposing the gain. Furthermore, the rotation-rate measurement accuracy is better at high rates of rotation using the dual staircase approach.

Figure 8A:
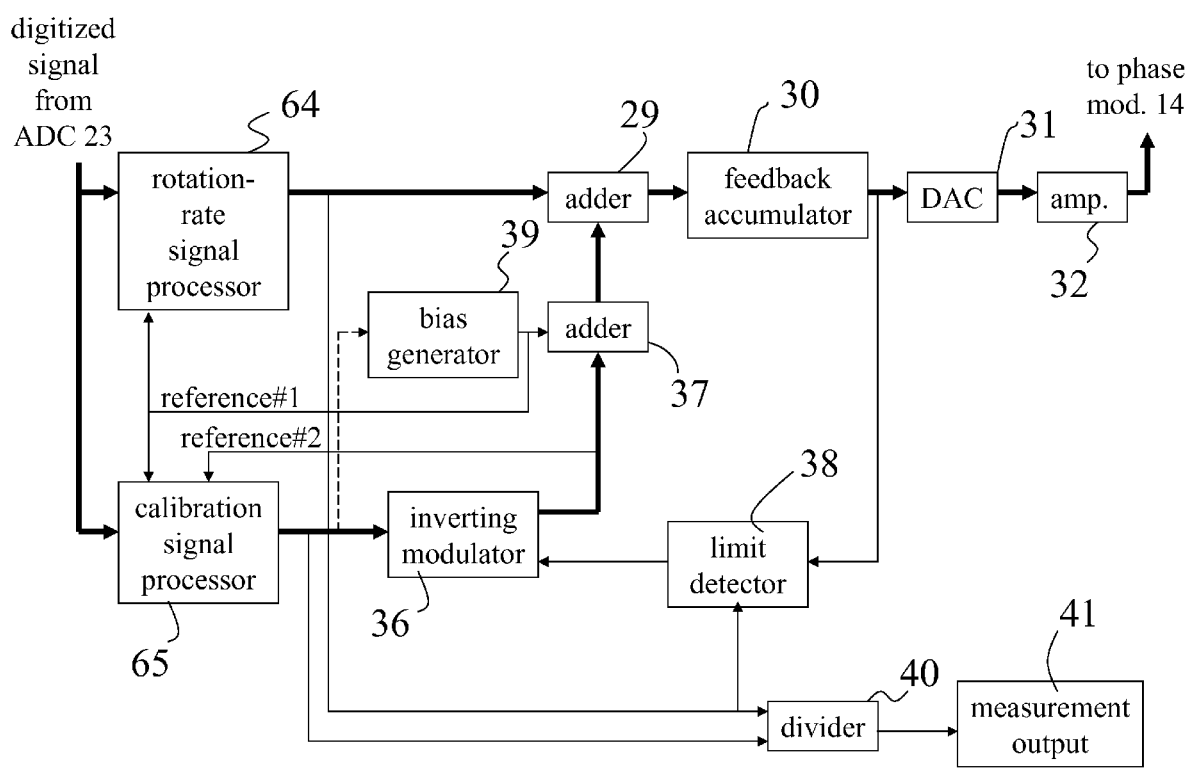
FIGS. 8a & 8b shows two block diagrams of the dual-staircase signal processing of the present invention.
Figure 8B:
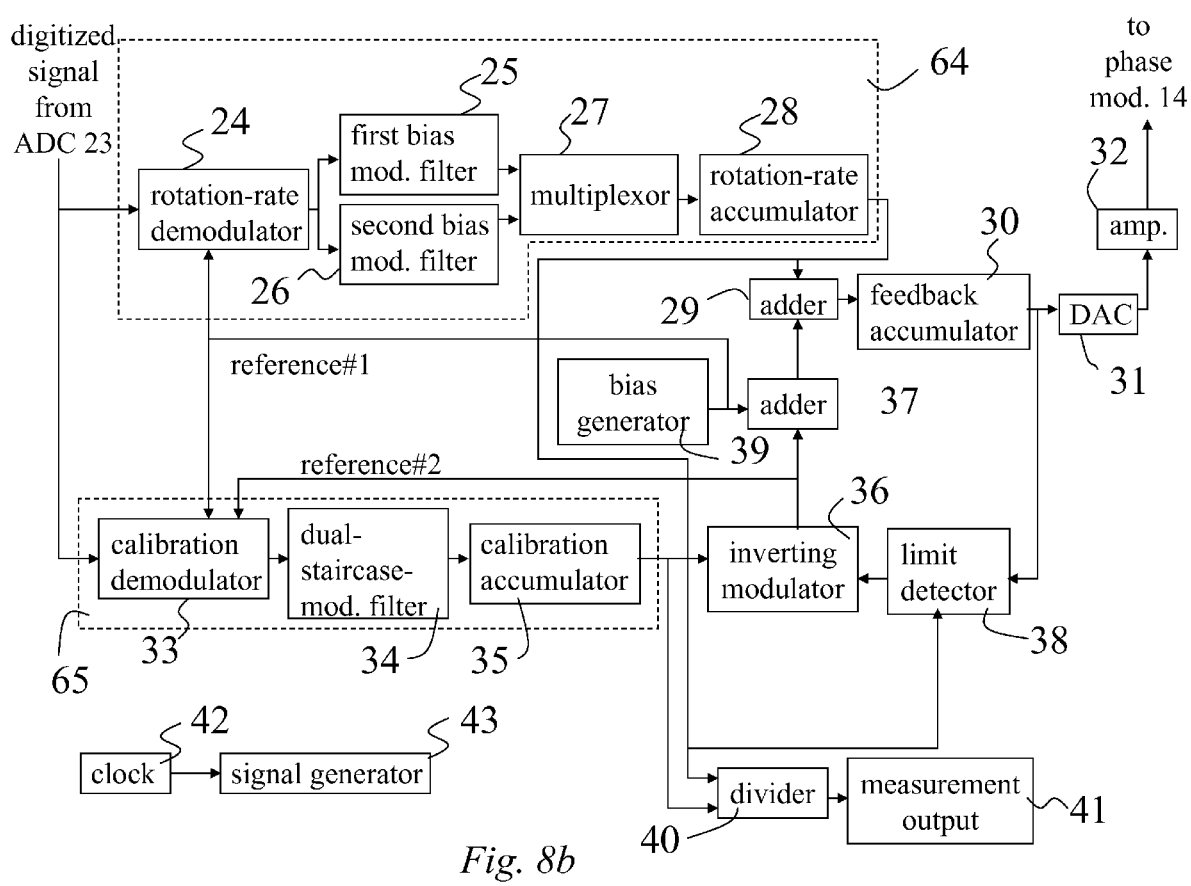

D. Signal Processing and Digital-To-Analog Conversion Electronics Block Diagrams The signal processing for the dual-staircase approach of the present invention is described in this subsection with the help of two block diagrams, see FIG. 8. FIG. 8a emphasizes the paths of control signals of the two major control loops, i.e. the rotation rate loop and the calibration loop. A detailed block diagram of the same signal processing is shown in FIG. 8b.

Referring particularly to FIG. 8a and the FIG. 1, the two feedback control loops discussed above, i.e., the calibration control loop and the rotation rate control loop, have common signal paths, both optical and electrical, from phase modulator 14 of interferometer 10, through the optics to the detector 11, and through the analog-to-digital conversion electronics 12. The paths of both loops are completed through the closed loop signal processing 13 and digital-to-analog conversion electronics 12 before returning to the phase modulator 14. These common signal paths, at least in part, are particularly identified by way of heavy dark lines in FIG. 8a. They are common through part of the electronics; specifically from adder 29; through feedback accumulator 30; through digital-to-analog converter (DAC) 31; and amplifier 32 and on to the phase modulator 14. The paths of the control loops differ in the beginning of the signal processing electronics. The path of the signal of the rotation rate loop passes through a rotation-rate signal processor 64 and then on through adder 29; whereas the path of the signal of the calibration loop passes through a calibration signal processor 65; through an inverting modulator 36, an adder 37, before adding to the signal of the rotation rate loop in adder 29.

In FIG. 8a, the output of from ADC is provided as an input to rotation rate signal processor 64 and calibration signal processor 65. The output signal of rotation rate signal processor 64 is provided as a first input to signal adder 29, a first input of signal divider 40, and limit detector 38. The output signal of calibration signal processor 65 is provided as a second input to signal adder 29 sequentially through signal inverting modulator 36 and signal adder 37, and as the second input of signal divider 40. The output of signal divider 40 is provided as the input to measurement output signal electronics 41. The output of signal adder 29 is provided as the input to feedback accumulator 30. In turn, the out put of signal accumulator 30 is provided as the input to phase modulator 14 sequentially through digital-to-analog converter 31 and amplifier 31. As a second input to limit detector 38 is the output of feed accumulator 30.

A few digital signals within the signal processing block diagram just described will now be identified. The rotation-rate signal processor 64 produces at its output a digital value that is proportional to the rotation rate, herein identified as the "rotation-rate digital value." The calibration signal processor 65 produces at its output a digital value corresponding to an optical phase difference of pi radians, herein identified as the "pi digital value." The inverting modulator 36 produces at its output a signal that changes back and forth from a positive pi digital value to a negative pi digital value, and a signal herein identified as the "modulated pi digital value." Further, the output of the limit detector 38, having as inputs (i) the rotation-rate digital value, and (ii) the output of the feedback accumulator 30, is a single bit received by the inverting modulator 36. The output of the bias generator 39 is added to the modulated pi digital value in adder 37, and its output is added to the rotation-rate digital value in adder 29.

Also shown in FIG. 8a is bias generator 39 and divider 40. The output signal of bias generator may be used as an input the pi digital value, but it is not necessary for accurate rotation-rate measurements. Divider 40, having as inputs (i) the rotation-rate digital value, and (ii) the pi digital value, provides an output signal indicative of the measurement of rotation rate that is received by the measurement output 41 and it is made available for external use.

Figure 3:
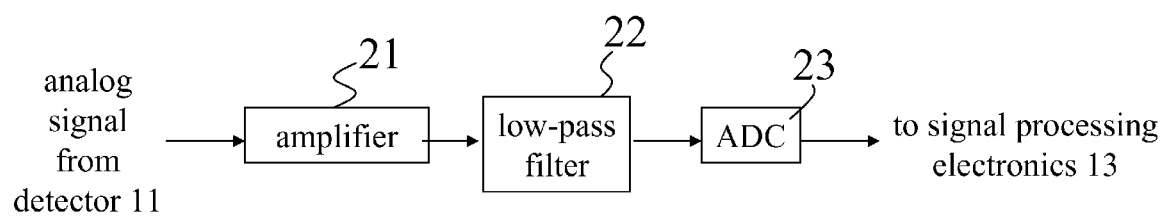
FIG. 3 is a block diagram representing of analog-to-digital conversion electronics of the related art and of the present invention.

While connections between blocks of FIG. 8a have been described, and a few signals have been introduced, description of FIG. 8a is continued here with a brief explanation of the block functions. The signal enters the block diagram from the analog-to-digital conversion electronics 12 in FIG. 1, or more particularly from ADC 23 in a detailed block diagram of those electronics in FIG. 3. It is simultaneously processed in both the rotation-rate signal processor 64 and the calibration signal processor 65. The output of the rotation-rate signal processor 64 is the rotation-rate digital value. The rotation rate digital value is proportional to the Sagnac phase difference. The output of the calibration signal processor 65 in the dual staircase implementation is the pi digital value. The pi digital value is a measure of the digital value that when added to the digital signal sent to the phase modulator 14 will result in a step in the optical phase of pi radians.

Inverting modulator 36 serves to change the sign of the pi digital value in order to derive a signal that switches back and forth from plus to minus the pi digital value. This modulated pi digital value becomes the phase difference modulation, i.e. plus and minus pi radians, of the calibration control loop. The rotation rate digital value and the modulated pi digital value are added together in adder 29 to bring the two control loops back together. Since, the output of bias generator 36, i.e., bias phase difference waveform generator, is also added into the signal in adder 37, the feedback accumulator 30 is the effective sum of three digital signals.

Feedback accumulator 30 performs an accumulation, i.e. it adds its input to its output to derive a new output, once per time period $\tau$. The time between accumulations is chosen to match the difference in propagation time from phase modulator 14 to detector 11 for the two counter-propagating light waves. If the times are well matched, then transforming from phase modulation to phase difference modulation will compensate for the transformation through the feedback accumulator 30. Accordingly, the input to the feedback accumulator corresponds to the phase difference modulation.

It is of paramount importance in understanding that the inverting modulator 36 is a significant part of the present invention. It is an innovation that allows the application of the rotation-rate and calibration control loops to the dual-staircase approach. In the prior art dual-staircase embodiment, one control loop was used to determine a value equal to the sum of the pi value plus the rotation-rate value and a second control loop was used to determine a value equal to sum of the negative of the pi value plus the rotation-rate value. In the preferred embodiment of the present invention, these values are determined using the modulated pi value derived within the calibration control loop plus the rotation-rate value derived within the rotation-rate control loop.

In the present invention, the feedback accumulator 30 (i) acts upon the plus pi digital value plus the rotation-rate digital value to derive the closed-loop portion of the up steps, and (ii) it acts upon the negative of the pi digital value plus the rotation-rate digital value to derive the closed-loop portion of the down steps. Of course, the bias modulation is added to the up and down steps to complete the modulation. If we ignore the bias modulation, the heights of the up-steps and the down-steps are largely derived from the inverting modulator 36. Whereas, in the staircase-and-fall-back approach, the singular down step is a result of an overflow of the feedback accumulator 46, as shown in FIG. 4. In the latter case, this overflow technique of creating a down-step does not allow the creation of multiple down-steps in a row with duration of the feedback accumulator update rate time period, $\tau$, as is necessary in the dual-staircase approach.

In practice of the present invention, the output of the feedback accumulator 30 in the dual-staircase approach preferably is kept within a range of values to avoid overflows of the digital logic with the result of inaccurate phase modulation. The range, for example, may be set at 4 times the pi digital value. After every pair of steps, i.e. every $2\tau$, the limit detector 38 determines whether a change in the direction of the steps generated by the feedback accumulator 30 will exceed the range based on (i) the current output of the feedback accumulator, and (ii) the current rotation-rate digital value. If the range will not be exceeded in the succeeding two steps, then the direction of the steps is changed. If the range would be exceeded then the step direction is kept the same. Limit detector 38 outputs a single bit received by the inverting modulator 36 to direct the inverting modulator 36 to output a positive or negative pi digital value. The sign of the pi digital value determines the sign of the input of the feedback accumulator 30, and the sign of the input of the feedback accumulator 30 determines whether an up step or a down step occurs at the output of the feedback accumulator 30.

It should be noted that limit detector 38 has the opportunity to change directions of the steps every $2\tau$ as stated above. It does so by changing the sign of the modulated pi digital value. In other words, it changes the sign of the calibration modulation of phase difference from plus pi to minus pi, and an integer number of bias modulation cycles is spent on plus pi and an integer number of bias modulation cycles is spent on minus pi. The result is a good measurement of each phase difference and a significantly improved determination of the pi digital value over that of the prior art.

In accordance with the present invention, the relationship between digital values in the signal processing electronics and phase modulation of the counter-propagating waves may be described with a transfer function. The transfer function of the staircase-and-fall-back approach of the prior art is controlled and thus stabilized by its calibration feedback loop. The transfer function of the dual-staircase approach of the present invention is measured by its calibration loop and the result is the pi digital value. Divider 40 divides the rotation-rate digital value by the pi digital value, and provides an output that is a digital value that is an accurate measure of rotation rate, independent of the transfer function between digital values and optical phase modulation.

Referring now to FIG. 8b, where similar functioning components have retained the same numeral designation as FIG. 8a, there shown is a detailed block diagram of the rotation-rate signal processor 64 and calibration signal processor 65, along with the rest of the closed loop signal processing and digital-to-analog conversion electronics 13. The two signal processors 64 and 65 are shown enclosed within dashed lines. The rotation-rate signal processor 64 and the calibration signal processor 65 are similar with differing functions, of course. They both perform demodulation to obtain an error signal, digital filtering to remove unwanted high frequency signals from the error signals, and accumulation to complete the control loop and obtain a desired digital value corresponding to a particular phase difference. Demodulation distinguishes the rotation-rate error signal from the calibration error signal. As illustrated in FIG. 8b, rotation rate signal processor 65 includes rotation rate demodulator 24, followed by first and second bias modulation filters 25 and 26. In turn, the output of filters 25 and 26, are passed to rotation rate accumulator through multiplexor 27. Calibration signal processor 65 includes calibration demodulator 33 followed by a dual staircase modulation filter, which in turn is fed to calibration accumulator 35.

Each of the aforesaid demodulators sample the output from the ADC 23 and is multiplied by a reference signal, not shown. This reference signal changes back and forth from a value of plus one and minus one. In the rotation-rate demodulator 24, the reference is preferably a square wave at the same frequency as, and synchronous to, the bias modulation. The calibration demodulator reference signal is slightly more complex. The same square wave as described above is multiplied by another unity amplitude waveform whose sign depends upon whether the received signal is the result of an up step or a down step. From the point of view of the phase difference the square wave reference signal, synchronous with the bias modulation, is multiplied by (a) a positive one for samples resulting from positive phase differences, and (b) a minus one for samples arising from a negative phase difference. A third way of describing the reference to the calibration demodulator is that it is the product of a unity amplitude square wave matching the bias modulation and a unity amplitude waveform matching the modulated pi digital value.

The signal is filtered after demodulation, and to explain the filter operation it is helpful to look more closely at the signals entering the demodulators. The detector 11 of the interferometer output (FIG. 1) is proportional to the detected optical power. It is amplified, filtered, and sampled by the ADC 23 many times during the flat portion of each phase step, i.e. many samples per time period, $\tau$, for the purpose of averaging out noise. These many samples for any given $\tau$ can be considered as a group to form one signal component because they are all treated the same by the electronic signal processing. All of the samples for the optical power resulting from any individual phase step are multiplied by the same value in the demodulator and are summed. Thus we can assign the one signal level to any given phase difference.

The dual-staircase scheme strives to use four values of phase difference. These correspond to two values of calibration modulation, e.g. $\pm\pi$, that are each split by the two values of bias phase difference modulation, e.g. $\pm\phi_{mbm}$. The four phase differences of the closed-loop dual-staircase approach are approximately equal to $\pm\pi\pm\phi_{mbm}$. If $\phi_{mbm}\cong\pi/2$ we can identify the four values as $\Delta\phi_1\cong\pi/2$, $\Delta\phi_2\cong3\pi/2$, and $\Delta\phi_4\cong-\pi/2$. During any given $\tau$ the relationship between achieved phase difference and desired phase difference is not exact. This results in a nonzero error signal. The error signal from one phase difference step is compensated for by error signals of future phase difference steps so that over time average of the actual phase difference values becomes increasingly close to the desired value of phase difference. To accomplish this averaging a signal related to the detected optical power during any given phase difference step is recorded. For phase difference $\Delta\phi_1$ we obtain signal x1 and likewise for $\Delta\phi_2$, $\Delta\phi_3$, and $\Delta\phi_4$ we obtain signals x2, x3, and x4, respectively. There is at least one new $\Delta\phi_1$, for every dual-staircase cycle, and each one is slightly different. For simplicity we use a single constant phase difference to identify them. Likewise the many corresponding signal values are all identified as x1. This is likewise true for $\Delta\phi_2$, $\Delta\phi_3$, $\Delta\phi_4$ and x2, x3, and x4.

Error signals are derived from these signals for each control loop. To obtain a complete and accurate measurement of phase difference, it is possible to use even numbers of phase difference values corresponding to integer numbers of periods of the bias modulation. As an example, and error formed by x1–x2 can be used to record deviations from the phase difference pi radians. The average deviation from pi radians can be reduced by accumulating many pairs of x1–x2 error signal in an accumulator and adjusting the values of $\Delta\phi_1$ and $\Delta\phi_2$. This is what was done in the prior art dual-staircase approach. In the dual-staircase approach of the present invention, it is necessary to combine this error signal with others. The error signal formed by x3–x4 may be used to record deviations from minus pi radians.

In the calibration control loop, the output of the dual-staircase-modulation filter 34 is the sum of all pairs of x1–x2 in a given sequence of up steps minus the sum of all pairs of x3–x4 in the subsequent sequence of down steps. The average of this filtered calibration error signal is zeroed by the calibration control loop by adjusting the amplitude of the pi modulation component of the feedback modulation. The output of the dual-staircase-modulation filter 34 becomes the input of the calibration accumulator 35 whose output is the pi digital value. The pi digital value is adjusted to zero the average of the filtered calibration signal error signal.

The rotation-rate loop can also use the error signal formed by x1–x2. If the calibration modulation amplitude is correctly adjusted then the error formed by x1–x2 would be due to an error in compensation of the Sagnac phase difference. In addition x3–x4 would provide the same amount of error if the error were truly due to imperfect compensation of the Sagnac phase difference. Both of these pairs are output from a first bias modulation filter 25 to pass through multiplexor 27 to be accumulated by the rotation-rate accumulator 28. Every $2\tau$ a new error signal output by the first bias modulation filter 25 and presented via multiplexor 27 to the input of the rotation-rate accumulator 28. The output of the rotation-rate accumulator 28 is the rotation-rate digital value. If the rotation rate digital value is correct and the pi digital value is incorrect, any finite error signal x1–x2 input to the rotation-rate accumulator will be compensated for by an opposite error signal x3–x4.

Increasing the update rate of the rotation-rate accumulator 28 from once every $2\tau$ to once every $\tau$ can be accomplished using two parallel bias modulation filters instead of just one filter. This is part of the present invention. Other error signals for the rotation-rate loop are available at times staggered with respect to the error signals mentioned above. Whereas the above signals are completed after $\Delta\phi_2$ and $\Delta\phi_4$. Other error signals can be completed after $\Delta\phi_1$ and $\Delta\phi_3$. Consider –x4+x1 and –x2+x3 and also during sequences that include more than two steps in any given direction –x2+x1 and –x4+x3. These error signals can be made available using second bias modulation filter 26. The output of this filter also occurs once every $2\tau$, but at times staggered by $\tau$ with respect to the former error signals prepared by the first bias modulation filter 25. The output of the second bias modulation filter 26 can be made available to the rotation-rate accumulator 28 through the multiplexor 27.

An example of a portion of a sequence might be . . . , $\Delta\phi_4$, $\Delta\phi_1$, $\Delta\phi_2$, $\Delta\phi_3$, $\Delta\phi_4$, $\Delta\phi_3$, $\Delta\phi_4$, $\Delta\phi_1$, $\Delta\phi_2$, $\Delta\phi_3$, $\Delta\phi_4$, $\Delta\phi_1$, $\Delta\phi_2$, $\Delta\phi_3$, $\Delta\phi_4$, $\Delta\phi_1$, . . . where we see that four down steps occurred in a row in this example. The electronics then derives signals corresponding to this sequence . . . , x4, x1, x2, x3, x4, x3, x4, x1, x2, x3, x4, x1, x2, x3, x4, x1, . . . Through the rotation-rate demodulator we obtain the sequence . . . , –x4, x1, –x2, x3, –x4, x3, –x4, x1, –x2, x3, –x4, x1, –x2, x3, –x4, x1, . . . Now through the first bias modulation filter 25 we obtain a new value every 2τ according to the sequence . . . , x1–x2, x3–x4, x3–x4, x1–x2, x3–x4, x1–x2, x3–x4, . . . Through the second bias modulation filter 26 we also obtain a new value every 2τ according to the sequence . . . , –x4+x1, –x2+x3, –x4+x3, –x4+x1, –x2+x3, –x4+x1, –x2+x3, –x4+x1, . . . Through the multiplexor 27 one new signal is available every τ in the sequence of . . . , –x4+x1, x1–x2, –x2+x3, x3–x4, –x4+x3, x3–x4, –x4+x1, x1–x2, –x2+x3, x3–x4, –x4+x1, x1–x2, –x2+x3, x3–x4, –x4+x1, . . . Note that an ending value of one of the differences is always the beginning value of the subsequent difference.

For completeness, the output of the dual-staircase modulation filter 34 for the above example sequence would be . . . , x1–x2–(x3–x4)–(x3–x4), x1–x2–(x3–x4), x1–x2–(x3–x4). The subtraction of the signal from the down step pairs makes this a fundamentally different error signal than is present in the rotation-rate control loop. We arbitrarily determine that the cycle is complete after the last down step and before the first up step. Thus an error signal is generated after the signal transitions from an x4 to an x1 in the sequence. The pi digital value does not change quickly and there is no reason to speed up the calibration control loop, so parallel filters are not useful in the calibration control loop.

E. Modulation Waveforms

Exemplary waveforms are now presented to aid in further understating of the present invention. The feedback modulation of the phase of the counter-propagating lightwaves as imparted at the phase modulator 14 is depicted waveforms in FIGS. 9a and 10a. This is an intermediate step to creating the resultant waveforms of the modulation of the difference between the phase of the two waves as they interfere with each other at the detector. In FIGS. 9-12, emphasis will be placed on describing this phase difference modulation as well as the resultant detected optical power in FIGS. 10-12.

The phase modulation waveform is designed to accomplish four major tasks simultaneously, and can be understood as the sum of three separate waveforms. The first of these three waveforms is a bias modulation waveform that enables the electronics to create a demodulated error signal that is linearly related to any additional phase differences over a limited range. The second is a feedback waveform that compensates for the phase modulation due to rotation. This compensation is imperfect in the short term, but by keeping the phase difference within the above limited range, the error is not lost and compensated for in the long term. The third waveform performs two functions: it keeps the total phase modulation waveform from exceeding the capability of the phase modulator 14 and it enables the measurement of the gain between the electronics and the phase difference modulation created via the phase modulator 14. Improving this third waveform is one of the purposes of this invention. Each of these three waveforms are discussed in the next few paragraphs.

Consider first the component of the phase modulation waveform that concerns the bias modulation. The close-loop signal processing and digital-to-analog conversion electronics, i.e. signal processor 13, is configured so that the variation in the demodulated error signal as a function of the difference in phase produced between the two waves in the neighborhood of iπ is approximately linear, where i is an integer. This arrangement makes it possible to obtain a very high sensitivity of the variation in the demodulated error signal in the neighborhood of the iπ in the phase difference. It is readily appreciated that without the bias modulation the dependency of the detected optical power on the phase difference is of cosine form, and the sensitivity in the iπ neighborhood of the phase difference is very low. High sensitivity is obtained by adding a bias modulation signal $\phi_{mb}(t)$ to the control signal for the phase modulator. The preferred bias phase modulation signal is a square wave with period equal to 2τ and peak-to-peak amplitude $\phi_{mbm}$. This creates a phase difference modulation with the same period 2τ, but with twice the amplitude alternating back and forth from $+\phi_{mbm}$ to $-\phi_{mbm}$. The demodulated signal is of sine form that is linear in the neighborhood of iπ, where i is any integer or zero.

Consider next the component of the phase modulation waveform that concerns the rotation rate feedback. The function of the processing electronics, herein signal processor 13, is likewise to generate a phase difference that is equal and opposite the phase difference created by the rotation rate. That is to say that when the rotation rate introduces a phase difference between the two waves in the interferometer, this difference produces a variation in the signal emitted by the detector 11 provoking, via the signal processor 13 and the phase modulator 14, an action that is equally and oppositely directed to the phase shift produced initially, so that the sum of these two phase differences is brought back to the null value. For this purpose, signal processor 13 generates a staircase negative feedback signal. Each step has duration of τ and a step height that is on average equal to the phase difference due to rotation rate.

Consider next the component of the phase modulation waveform that is for the measurement and control of the modulation amplitude. Signal processor 13 is configured to add a third waveform component that shifts the operating phase difference alternately between values of iπ not including the bias modulation. The total phase difference, including the bias modulation, is then $i\pi \pm \phi_{mbm}$. Typically two integer values of i are chosen for the purposes of measuring the interferogram and keeping the phase modulator within its limited range of phase shift. As an example, the values of i might be one and minus one. The total phase difference including the bias modulation shifts between the four values: $\pi \pm \phi_{mbm}$ and $-\pi \pm \phi_{mbm}$. If $\phi_{mbm}=\pi/2$, then the four values are $3\pi/2$, $\pi/2$, $-\pi/2$, and $-3\pi/2$. These four points are especially useful because they represent the steepest slopes of the interferogram closest to the phase difference of zero. Therefore the highest sensitivity of the signal to phase difference variations occurs around these phase difference values. The amount of time spent on each value is τ if the bias modulation period is 2τ. An integer number of bias modulation periods are spent on phase differences greater than zero before transitioning to phase differences that are less than zero, and an integer number of bias modulation periods are spent on phase differences less than zero before transitioning back to phase differences that are greater than zero. This gives an accurate measurement of the value required within the electronics to create the phase difference modulation of pi radians.

The three components of the phase modulation are synchronous with each other. The constant portions occur at the same time, and likewise the transitions from one constant value to another also coincide in time.

We define a sloping section of the interferogram to be between $k\pi$ and $(k+1)\pi$, where k is any integer. It is advantageous to shift the phase difference and make measurements on four different sloping sections of the interferogram.

Figure 9:
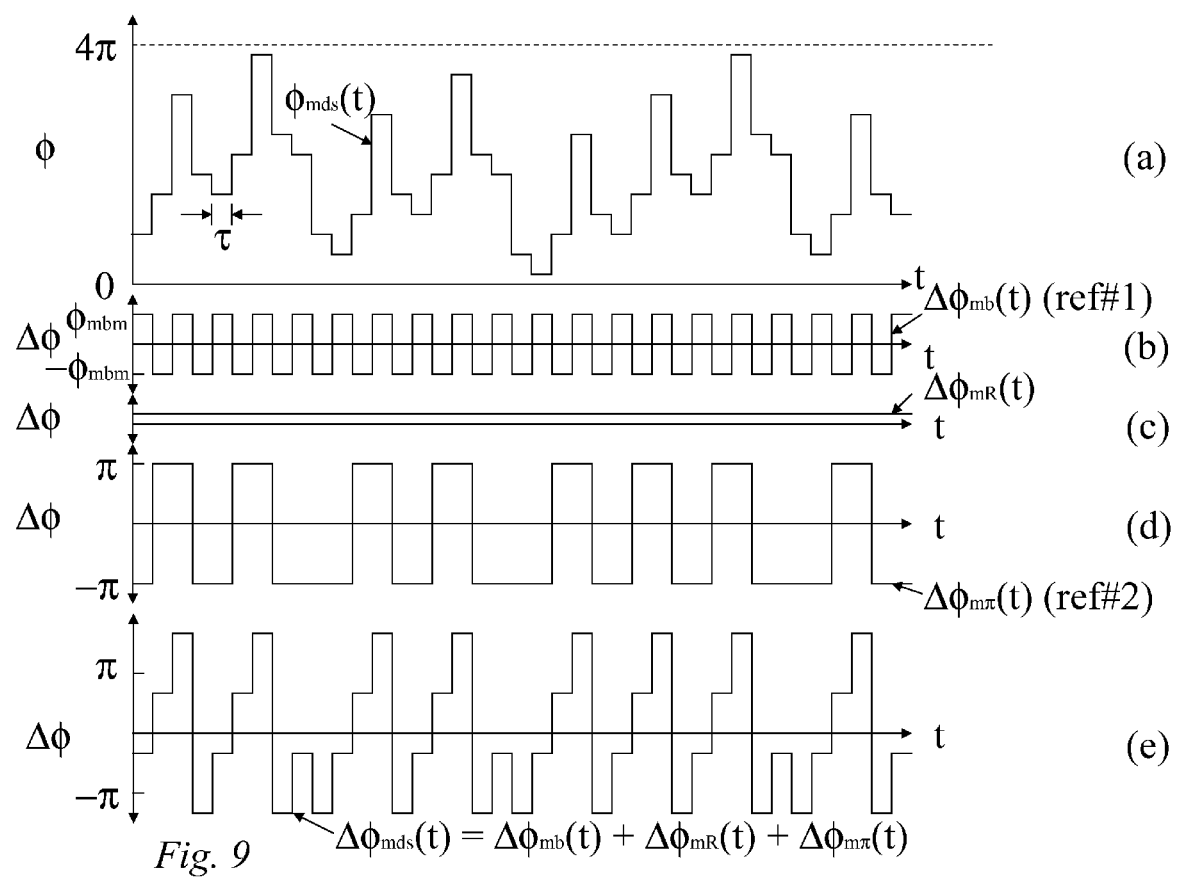
FIG. 9 represents the dual staircase phase modulation $\phi_{mds}(t)$ (9a) and the three component waveforms, including the bias phase difference modulation $\Delta\phi_{mb}(t)$ (9b), the rotation compensating phase difference $\Delta\phi_{mr}(t)$ (9c), and the pi phase difference modulation $\Delta\phi_{m\pi}(t)$ (9d), that are added together make up the total phase difference modulation $\Delta\phi_{mds}(t)$ (9e).
Figure 10:
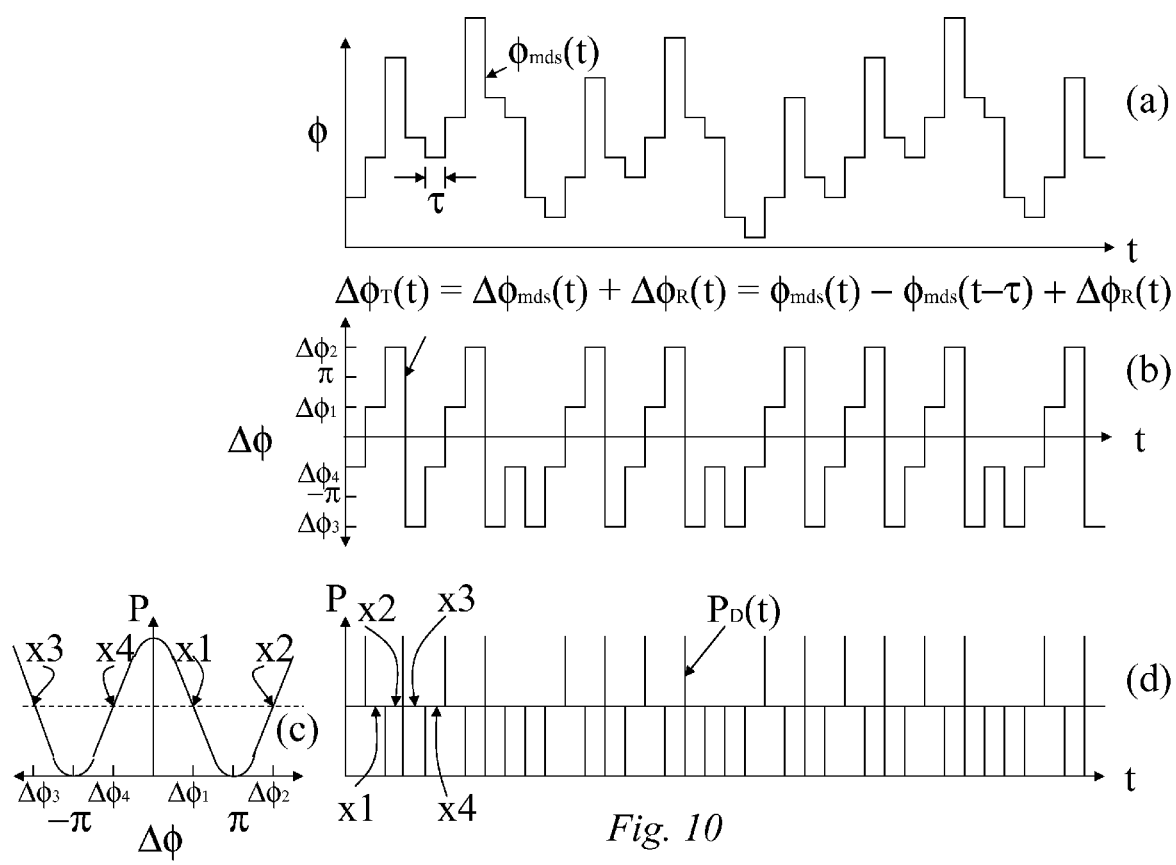
FIG. 10 represents the dual staircase phase modulation $\phi_{mds}(t)$ (10a), the total phase difference $\Delta\phi_T(t)$ (10b) including the phase difference due to modulation and the Sagnac phase difference due to rotation, the interferogram (10c) that maps phase difference into detected optical power, and the detected optical power $P_D(t)$ vs. time (10d).

FIG. 9 shows the dualramp phase modulation waveform (FIG. 9a) for the case where the rotation induced phase difference is equal to minus pi/6, $\Delta\phi_R=-\pi/6$. The stepped version of the dualramp waveform consists of changing back and forth between sequences of up steps and sequences of down steps. We restrict the waveform to even numbers of steps during an up step sequence and an even number of steps during a down step sequence while making a measurement for the calibration loop. Thus an integer number of bias modulation periods occur while the phase difference is less than zero and an integer number of bias modulation periods occur while the phase difference is greater than zero for every measurement that is clocked into the calibration accumulator. This improves the accuracy of the pi digital value and the rotation rate measurement accuracy.

The phase modulation shown in FIG. 9a is also a graphical representation of the digital values at the output of the feedback accumulator 30. The graphical representation of the digital values entering the feedback accumulator 30 is shown in FIG. 9e. The ordinate axis of this graph is labeled as phase difference because these waveforms are also representative of the modulation of the phase difference between the counter-propagating waves as they interfere at the detector. Another way to look at this is that the accumulation function of the feedback accumulator is undone by the difference function performed by the Sagnac loop interferometer The relationship between the digital signal entering the feedback accumulator 30 and the phase difference modulation of the counter-propagating waves has a simple explanation if the update rate of the accumulator matches the time delay, $\tau$, between the wave that takes the short path from phase modulator 14 to the detector 11 and the other counter-propagating wave that takes the long path. Basically the transformation of phase modulation to phase difference modulation reverses the affect of the accumulation performed in the feedback accumulator 30.

This can be described mathematically by assuming a function $f(t_0)$ that is clocked into the accumulator at time $t=t_0$ and showing that $\Delta\phi(t) \propto f(t_0)$ for time between accumulation events at $t_0$ and time $t_0+\tau$, i.e. $t_0 \leq t < t_0+\tau$. If $f(t)$ is clocked into the accumulator every $\tau$ up until time $t=t_0$, then the output is $$F(t) = \sum_{i=0}^{\infty} f(t_0 - i\tau) \text{ for } t_0 \leq t < t_0 + \tau$$

At an earlier time $$F(t-\tau) = \sum_{i=1}^{\infty} f(t_0 - i\tau) \text{ for } t_0 - \tau \leq t - \tau < t_0$$

Taking the difference $$F(t)-F(t-\tau)=f(t_0)$$

and finally noting that $F(t) \propto \phi(t)$ then $$\Delta\phi(t) \propto f(t_0) \text{ for } t_0 \leq t < t_0+\tau.$$

FIG. 9e is the sum of the three waveforms shown in FIGS. 9b, 9c and 9d. These include the square wave bias modulation phase difference $\Delta\phi_{mb}(t)$ with the phase difference peak amplitude of $\phi_{mbm}=\pi/2$ (FIG. 9b), the rotation-rate phase difference modulation $\Delta\phi_{mR}$ equal to plus pi/6, to compensate for the phase difference due to rotation (FIG. 9c), and the pi shifting phase difference $\Delta\phi_{m\pi}(t)$ equal to plus and minus pi to control and measure the phase modulation amplitude (FIG. 9d). The latter also keeps the total modulation waveform within a predetermined range. The total phase difference modulation has a long-term average value of zero as is necessary to keep the phase modulator or the drive electronics from exceeding their capability. The phase difference modulation will assume the sequence of values of $\pi/2, 3\pi/2, -3\pi/2$, and $-\pi/2$ when the rotation rate is zero. When the rotation rate is nonzero the total phase difference, the sum of the phase difference modulation and the Sagnac phase difference, will assume the same values but with a modification of the sequence. The sequence must change to keep the average value of the phase difference modulation zero, and thus keep the phase modulation within its designated $4\pi$ range.

FIG. 10a shows a copy of the dualramp phase modulation waveform shown in FIG. 9a. It is applied to both of the counter-propagating waves as they pass through the phase modulator 14. After passing through the phase modulator one of the counter-propagating waves takes $\tau$ seconds longer to reach the detector than the other. Thus of the two waves arriving simultaneously at the detector one received its phase modulation $\tau$ seconds before the other. The phase modulation, $\phi_{mds}(t)$, is thereby converted to the phase difference, $\Delta\phi_{mds}(t)$, modulation by the interferometer delays according to the formula $\Delta\phi_{mds}(t)=\phi_{mds}(t)-\phi_{mds}(t-\tau)$. The phase difference modulation adds to the Sagnac phase difference to create the total phase difference between the counter-propagating waves at the detector, shown in FIG. 10b. The total phase difference is locked to the four phase difference values $-\pi\pm\phi_{mbm}$ and $\pi\pm\phi_{mbm}$ by the closed-loop electronics. If $\phi_{mbm}=\pi/2$ then the four phase difference values are $-3\pi/2$, $-\pi/2$, $\pi/2$, and $3\pi/2$ as is shown in FIG. 10b. The graph of optical power vs. phase difference between the interfering waves is shown in FIG. 10c and is known as the interferogram. The interferogram, FIG. 10c, maps the total phase difference to detected optical power, and therefore it maps the total phase difference vs. time, FIG. 10b, into the detected optical power vs. time, FIG. 10d.

Figure 11:
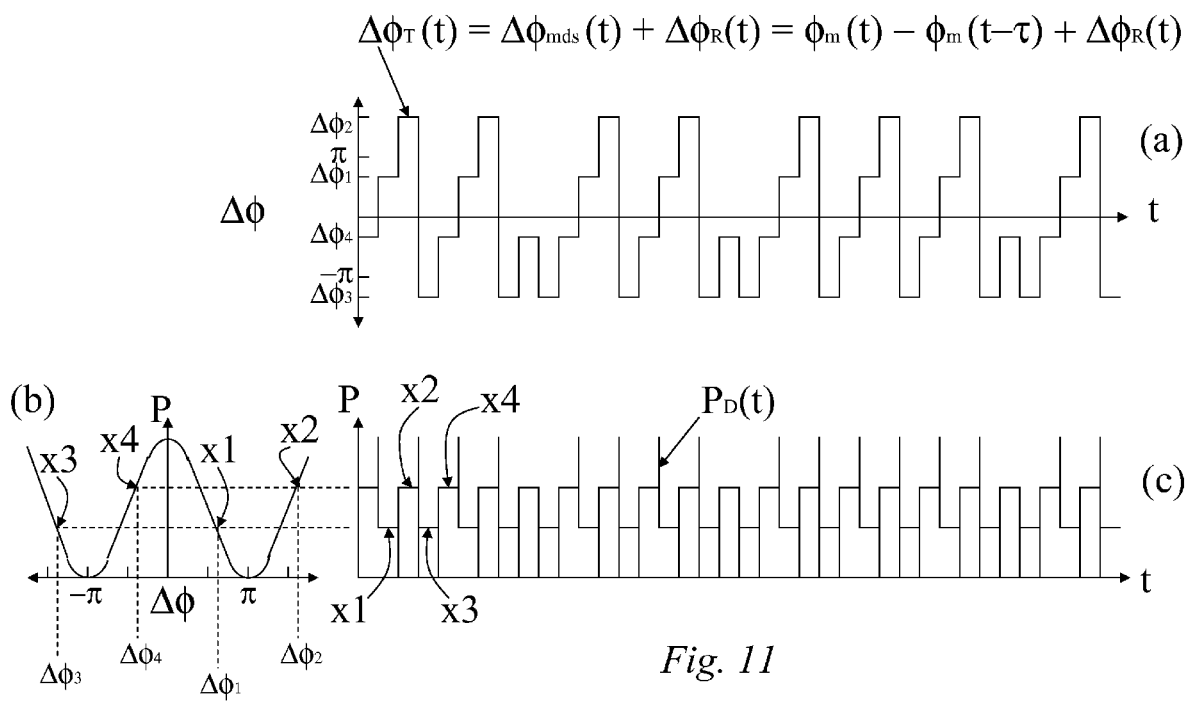
FIG. 11 represents the total phase difference $\Delta\phi_T(t)$ (11a) of the dual-staircase approach with an error in the cancellation of the Sagnac phase difference, the interferogram showing the detected optical power vs. phase difference (11b) and the resulting detected optical power $P_D(t)$ vs. time (11c) showing the modulation at the bias modulation frequency due to incomplete cancellation of the Sagnac phase shift.
Figure 12:
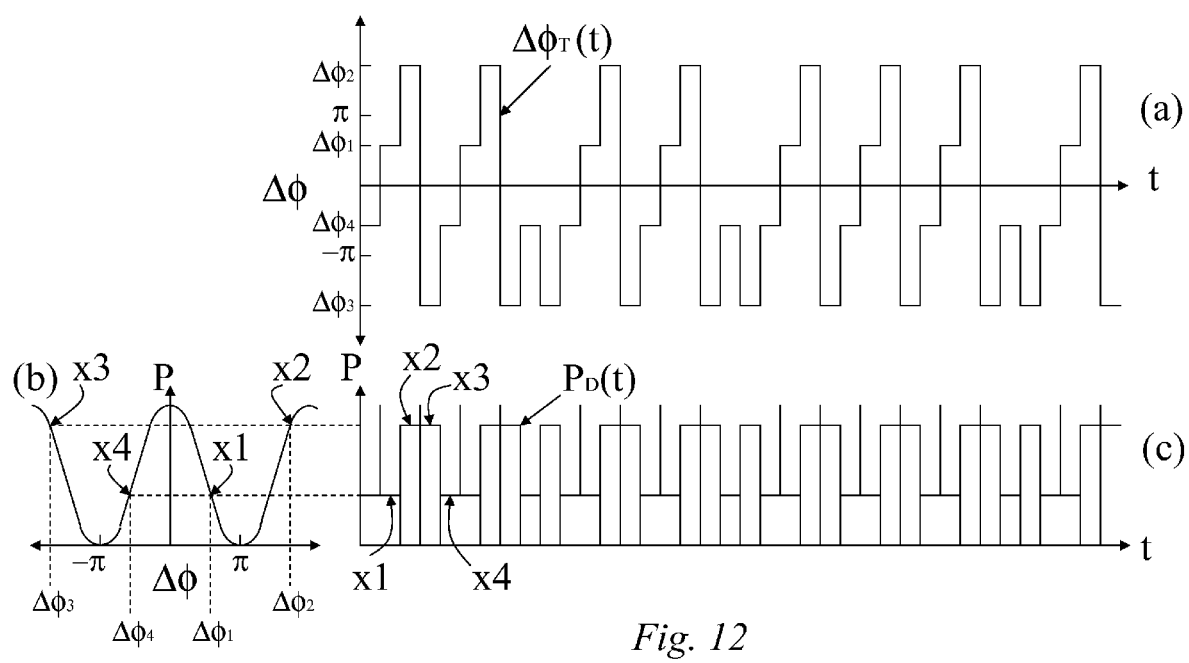
FIG. 12 represents the stepped version of the total phase difference $\Delta\phi_T(t)$ (12a) of the dual-staircase approach with an error in the amplitude of the phase difference modulation, the interferogram showing the detected optical power vs. phase difference (12b) and the resulting detected optical power $P_D(t)$ vs. time (12c) showing the power modulation due to inaccurate phase modulation amplitude.

The two control loops, the rotation-rate control loop and the calibration control loop, are used to maintain the phase difference values by keeping the detected power flat in time not including the short transients that occur as a result of the transitions from one phase difference value to another. FIG. 11 shows how an error in the rotation-rate digital value will affect the total phase difference, FIG. 11a, and the detected optical power, FIG. 11c. The rotation-rate demodulator will multiply the detector optical power by the square wave reference signal and will create the rotation-rate error signal that will be used by the rotation-rate accumulator to correct the rotation-rate digital value. Once the rotation-rate digital value is correct the power signal will be flat and the rotation-rate error signal will be zero. FIG. 12 shows how an error in the pi digital value will affect the total phase difference, FIG. 12a, and the detected optical power, FIG. 12c. The calibration demodulator will multiply the detector optical power by the calibration reference signal and will create the calibration error signal that will be used by the calibration accumulator to correct the pi digital value.

FIG. 7 shows the prior art electronics with the difference of being implemented with digital electronics. The prior art electronics were designed with separate feedback loops for the up steps and the down steps. In this case one feedback loop is active and the other is inactive and then to change directions of the steps the other control loop is activated and the previously active control loop is made inactive. For example, during the up steps the positive step accumulator 45 is updated and drives the feedback accumulator 30 through multiplexor 47 and adder 48, and then afterwards, during the down steps, the negative step accumulator 46 is updated and drives the feedback accumulator 30 through multiplexor 47 and adder 48. This represents irregular updating of the accumulators. If the rotation rate changes during the up steps, the positive-step accumulator will have been updated, but the negative-step accumulator will not have been updated. This causes two problems. These compromise output accuracy and the stability of the control loops.

The rotation rate loop that is updated at regular intervals, such as once every $2\tau$ seconds, has been used in the ramp and reset methods, see for example U.S. Pat. No. 5,141,316. To use a rotation rate loop in the dual-ramp approach requires a calibration loop to create a pi digital value and a modulator 32 to change the sign of the calibration-digital value to alternately create the positive step values and the negative step values when the modulated calibration value is added to the rotation-rate digital value. Thus by adding the combination of accumulator and a modulator to create the calibration modulation to shift the phase difference to plus and minus pi h a rotation-rate control loop updated at regular intervals can be used in together with the dual-ramp modulation approach.

While the present invention has been particularly shown and described with reference to the accompanying figures, it will be understood, however, that other modifications thereto are of course possible, all of which are intended to be within the true spirit and scope of the present invention. It should be appreciated that components of the invention aforedescribed may be substituted for other suitable components for achieving desired results, or that various accessories may be added thereto.

It should be recognized by those skilled in the art, that the closed loop electronics may be implemented by wide array of techniques, both analog and digital, including firmware and software, without departing from the true spirit and scope of the present invention.

Although specific stair case ramps, and the like or more complex waveforms, and values have been selected to describe the present invention, others are of course possible in order to achieve the desired improved performance and accuracy of the Sagnac interferometer. Further, although the present invention has been particularly been described with reference to a Sagnac fiber interferometer, the present invention is of course applicable to a wide range of optical waveguides and other sensor applications of the Sagnac interferometer, all of which are intended to be within the true spirit and scope of the present invention.

What I claim:

1. A method of modulating the phase difference between a pair of optical waves that exit a Sagnac interferometer after having counter-propagated through a common optical path, including an optical fiber and a phase modulator, and impinges upon a detector that produces a detector output signal responsive to the combined optical power of said pair of optical waves and is indicative of the total phase difference between the pair of optical waves, and wherein the total phase difference includes (i) the Sagnac phase difference, and (ii) a phase-difference modulation induced by said phase modulator in response to a command signal, and wherein said phase modulator is capable of imparting phase modulation substantially equally to said counter-propagating waves passing therethrough, the method comprising the steps of:
   driving said phase modulator with a command signal [S] that causes said phase-difference modulation between said pair of optical waves to have
      (i) a bias phase-difference modulation component [J] having a selected bias modulation amplitude and waveform,
      (ii) a rotation-rate feedback phase-difference component [K] that is equal in magnitude to, and opposite in sign of, the Sagnac phase difference, so that the sum of the two is controlled to be substantially zero, and
      (iii) a calibration feedback phase-difference modulation component; [Z]; and
   deriving a rotation-rate feedback phase-difference component signal [R] as a function of,
      (i) said detector output signal [D], and
      (ii) a bias modulation signal [B],
      where said rotation-rate feedback phase-difference component signal [R] is a signal processing counterpart of said rotation-rate feedback phase-difference component [K], and
   deriving a calibration signal [G] corresponding to a selected phase difference as a function of,
      (i) said detector output signal [D],
      (ii) said bias modulation signal [B], and
      (iii) a calibration feedback phase-difference modulation component signal [Y],
      where said calibration-feedback-phase-difference-modulation-component signal [Y] is a signal processing counterpart of said calibration feedback phase-difference modulation component [Z] ;
   deriving said calibration feedback phase-difference modulation component signal [Y] by modulating said calibration signal [G] in part to restrict the command signal [S] to a given range of values, and
   deriving said command signal [S] as a function of,
      (i) said rotation rate feedback phase difference component signal [R],
      (ii) said calibration feedback phase-difference modulation component signal [Y], and
      (iii) said bias modulation signal [B].

2. The method of claim 1 wherein said calibration feedback phase-difference modulation component signal is added to said rotation-rate feedback phase-difference component signal.

3. The method of claim 1 wherein the command signal is derived in part by a third control loop formed exclusively within the electronic signal processing.

4. The method of claim 3 wherein said modulation of said calibration feedback phase-difference modulation component signal is part of said third control loop.

5. The method of claim 1 wherein said modulation of said calibration feedback phase-difference modulation component signal is derived by alternating the sign of the calibration signal.

6. The method of claim 5 wherein the calibration feedback phase difference modulation component is characterized by a non zero calibration modulation fundamental frequency when the Sagnac phase difference equals zero, and said bias phase-difference modulation component is characterized by a bias modulation fundamental frequency, and said calibration modulation fundamental frequency is less than the bias modulation fundamental frequency.

7. The method of claim 6 wherein said calibration modulation fundamental frequency is equal to half of said bias modulation fundamental frequency.

8. The method of claim 5 wherein (i) said selected phase difference associated with said calibration signal is equal to $\pi$ radians, and (ii) the calibration feedback phase-difference modulation component switches back and forth from $\pi$ radians to minus $\pi$ radians.

9. The method of claim 1 wherein the calibration feedback phase-difference modulation component makes calibration transitions from one sign value to another, and said bias phase-difference modulation component makes bias transitions from one sign value to another, and a calibration transition occurs at substantially the same time as a bias transition.

10. The method of claim 1 wherein,
(i) the rotation-rate feedback phase-difference component signal is determined in a first feedback loop, including a first demodulator for demodulating the detector output relative to the bias modulation signal reference signal so as to null said detector output signal and provide an output signal indicative of the rotation rate of the Sagnac interferometer, and
(ii) the calibration signal is determined in a second feedback loop including a second demodulator for demodulating the detector output relative to the bias modulation signal and the calibration feedback phase-difference modulation component signal.

11. The method of claim 1 wherein propagation time of one of the counter-propagating waves from the phase modulator to the detector is $\tau$ seconds longer than the propagation time for the other counter-propagating wave from the phase modulator to the detector and the bias modulation signal has a period of $2\tau$ seconds.

12. The method of claim 11 wherein the calibration feedback phase-difference modulation component is held constant for duration equal to an even multiple of time periods of length of $\tau$ seconds between transitions of alternating sign values.

13. The method of claim 11 wherein said total phase difference between the pair of optical waves exiting the Sagnac interferometer assumes four distinct values each for duration $\tau$ seconds.

14. The method of claim 13 wherein each of said distinct value of said total phase difference corresponds to a different sloping section of an interferogram characterized by a plot of the detector output signal versus said total phase difference between the pair of optical waves exiting the Sagnac interferometer.

15. The method of claim 13 wherein said detector output is substantially equal for all of the four distinct values.

16. A method of modulating the phase difference between a pair of optical waves that exit a Sagnac interferometer after having counter-propagated through a common optical path, including an optical fiber and a phase modulator, and impinges upon a detector that produces a detector output signal responsive to the combined optical power of said pair of optical waves and is indicative of the total phase difference between the pair of optical waves, and wherein the total phase difference includes (i) the Sagnac phase difference, and (ii) a phase-difference modulation induced by said phase modulator in response to a command signal, and wherein said phase modulator is capable of imparting phase modulation substantially equally to said counter-propagating waves passing therethrough, the method comprising the steps of:
driving said phase modulator with a command signal that causes said phase-difference modulation between said pair of optical waves to have
(i) a bias phase-difference modulation component having a selected and waveform and
(ii) a rotation-rate feedback phase-difference component that is equal in magnitude to, and opposite in sign of, the Sagnac phase difference, so that the sum of the two is controlled to be substantially zero, and
(iii) a calibration feedback phase-difference modulation component; and
demodulating the detector output relative to a bias modulation reference signal thereby deriving a demodulated output signal, and
filtering said demodulated output signal with
(i) a first bias modulation filter to derive a first filtered demodulated output signal that is updated at first specific times relative to the bias modulation reference signal, and
(ii) a second bias modulation filter to derive a second filtered demodulated output signal that is updated at second specific times relative to the bias modulation reference signal, where said second specific times are different from said first specific times, and
multiplexing said first filtered demodulated output signal and said second filtered output signal thereby deriving a multiplexed filtered output signal, and deriving a rotation-rate feedback phase-difference component signal as a function of said multiplexed filtered output signal, and
deriving said command signal as a function of,
(i) said rotation rate feedback phase difference component signal, and
(ii) a bias modulation signal.

17. The method of claim 16 wherein said bias modulation signal is periodic having a bias modulation period and a first half-period and a second half period and said first filtered demodulated output signal is updated during each said first half-period and said second filtered output signal is updated during each said second half-period.

18. A modulation signal control system for modulating the phase difference between a pair of optical waves that exit a Sagnac interferometer after having counter-propagated through a common optical path, including an optical fiber and a phase modulator, and impinges upon a detector that produces a detector output signal responsive to the combined optical power of said pair of optical waves and is indicative of the total phase difference between the pair of optical waves, and wherein the total phase difference includes (i) the Sagnac phase difference, and (ii) a phase-difference modulation induced by said phase modulator in response to a command signal, and wherein said phase modulator is capable of imparting phase modulation substantially equally to said counter-propagating waves passing therethrough, the modulation signal control system comprising:
means for generating a bias modulation signal having a selected amplitude and waveform; and
a first signal processing means for deriving a rotation-rate feedback phase-difference component signal as a function of,
(i) said detector output signal, and
(ii) a bias modulation signal; and
a second signal processing means for deriving a calibration signal corresponding to a selected phase difference as a function of,
(i) said detector output signal,
(ii) said bias modulation signal, and
(iii) a calibration feedback phase-difference modulation component signal; and
signal modulating means for generating said calibration feedback phase-difference modulation component signal by modulating said calibration signal as a function of the command signal so as to restrict the command signal to a given range of values; and
third signal processing means for deriving said command signal as a function of,
(i) said rotation rate feedback phase difference component signal,
(ii) said calibration feedback phase-difference modulation component signal, and
(iii) said bias modulation signal.

19. The control system of claim 18 further including summing means for summing said calibration feedback phase-difference modulation component signal and said rotation-rate feedback phase-difference component signal.

20. The control system of claim 18 wherein a third control loop means formed exclusively within the electronic signal processing derives the command signal.

21. The apparatus of claim 20 wherein said signal modulating means is part of said third control loop.

22. The control system of claim 18 wherein said signal modulating means alternates the sign of the calibration signal.

23. The control system of claim 18 wherein the calibration feedback phase-difference modulation component makes calibration transitions from one sign value to another, and said bias phase-difference modulation bias component makes transitions from one sign value to another, and a calibration transition occurs at substantially the same time as a bias transition.

24. The control system of claim 18 wherein,
(i) the first signal processing means is part of a first feedback loop, including a first demodulator means for demodulating the detector output relative to the bias modulation signal reference signal so as to null said detector output signal and provide an output signal indicative of the rotation rate of the Sagnac interferometer, and
(ii) the second signal processing means is part of a second feedback loop including a second demodulator means for demodulating the detector output relative to the bias modulation signal and the calibration feedback phase-difference modulation component signal.

25. The control system of claim 18 wherein (i) said selected phase difference is equal to $\pi$ radians, and (ii) the calibration feedback phase-difference modulation component switches back and forth from $\pi$ radians to minus $\pi$ radians.

26. The control system of claim 18 wherein propagation time of one of the counter-propagating waves from the phase modulator to the detector is $\tau$ seconds longer than the propagation time for the other counter-propagating wave from the phase modulator to the detector and the bias modulation signal has a period of $2\tau$ seconds.

27. The control system of claim 26 wherein the calibration feedback phase-difference modulation component is held constant for duration equal to an even of time periods of length of $\tau$ seconds between transitions of alternating sign values.

28. The control system of claim 26 wherein said total phase difference between the pair of optical waves exiting the Sagnac interferometer assumes four distinct values each for duration $\tau$ seconds.

29. The control system of claim 28 wherein each of said distinct value of said total phase difference corresponds to a different sloping section of an interferogram characterized by a plot of the detector output signal versus said total phase difference between the pair of optical waves exiting the Sagnac interferometer.

30. The control system of claim 29 wherein said detector output is substantially equal for all of the four distinct values.

31. A modulation signal control system for modulating the phase difference between a pair of optical waves that exit a Sagnac interferometer after having counter-propagated through a common optical path, including an optical fiber and a phase modulator, and impinges upon a detector that produces a detector output signal responsive to the combined optical power of said pair of optical waves and is indicative of the total phase difference between the pair of optical waves, and wherein the total phase difference includes (i) the Sagnac phase difference, and (ii) a phase-difference modulation induced by said phase modulator in response to a command signal, and wherein said phase modulator is capable of imparting phase modulation substantially equally to said counter-propagating waves passing therethrough, the modulation signal control system comprising:
means for generating a bias modulation signal having a selected frequency, amplitude and waveform; and
means for demodulating the detector output relative to a bias modulation reference signal thereby deriving a demodulated output signal, and
means for filtering said demodulated output signal with
(iii) a first bias modulation filter means for deriving a first filtered demodulated output signal that is updated at first specific times relative to the bias modulation reference signal, and
(iv) a second bias modulation filter means for deriving a second filtered demodulated output signal that is updated at second specific times relative to the bias modulation reference signal, where said second specific times are different from said first specific times, and
means for multiplexing said first filtered demodulated output signal and said second filtered output signal thereby deriving a multiplexed filtered output signal, and deriving a rotation-rate feedback phase-difference component signal as a function of said multiplexed filtered output signal, and
means for deriving said command signal as a function of,
(i) said rotation rate feedback phase difference component signal, and
(ii) a bias modulation signal.

32. The control system of claim 31 wherein said bias modulation signal is periodic having a bias modulation period and a first half-period and a second half period and said first filtered demodulated output signal is updated during each said first half-period and said second filtered output signal is updated during each said second half-period.

* * * * *